(12) United States Patent
Islam et al.

(10) Patent No.: US 11,202,319 B2
(45) Date of Patent: Dec. 14, 2021

(54) RANDOM ACCESS RESPONSE WINDOW AMBIGUITY FOR MULTIPLE MESSAGE1 TRANSMISSIONS

(71) Applicant: QUALCOMM Incorporated, San Diego, CA (US)

(72) Inventors: Muhammad Nazmul Islam, Littleton, MA (US); Tao Luo, San Diego, CA (US); Bilal Sadiq, Basking Ridge, NJ (US); Linhai He, San Diego, CA (US); Sony Akkarakaran, Poway, CA (US); Wooseok Nam, San Diego, CA (US); Navid Abedini, Somerset, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 16/287,508

(22) Filed: Feb. 27, 2019

(65) Prior Publication Data
US 2019/0349999 A1     Nov. 14, 2019

Related U.S. Application Data

(60) Provisional application No. 62/669,265, filed on May 9, 2018.

(51) Int. Cl.
*H04W 74/08*     (2009.01)
*H04W 76/27*     (2018.01)
*H04W 76/10*     (2018.01)

(52) U.S. Cl.
CPC ....... *H04W 74/0833* (2013.01); *H04W 76/10* (2018.02); *H04W 76/27* (2018.02)

(58) Field of Classification Search
CPC .. H04W 74/0833; H04W 76/27; H04W 76/10
See application file for complete search history.

(56) References Cited

U.S. PATENT DOCUMENTS

| 6,349,210 | B1 * | 2/2002 | Li | ............... H04L 12/1868 |
| | | | | 370/329 |
| 2003/0161355 | A1 * | 8/2003 | Falcomato | ............ H04J 3/0623 |
| | | | | 370/539 |

(Continued)

OTHER PUBLICATIONS

Interdigital et al., "RACH Configuration of Multiple Msg1 Transmissions before then End of a Monitored RAR Window", 3GPP Draft; R1-1800598 (R15 NR WI AI 7142 Multiple MSG1 Transmission), 3rd Generation Partnership Project (3GPP), Mobile Competence Centre ; 650, Route Des Lucioles ; F-06921 Sophia-Antipolis Cedex ; vol. RAN WG1, No. Vancouver, Canada; Jan. 22, 2018-Jan. 26, 2018, Jan. 12, 2018 (Jan. 12, 2018), XP051384473, 4 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018], Figure 1, Sections 1-3.

(Continued)

*Primary Examiner* — Michael Thier
*Assistant Examiner* — Nevena Zecevic Sandhu
(74) *Attorney, Agent, or Firm* — Alan Gordon

(57) ABSTRACT

Methods, systems, and devices for wireless communications are described. A user equipment (UE) may transmit two or more connection requests prior to expiration of a UE connection response window. In some examples, the UE may re-set a UE connection response window each time the UE transmits a connection request. In some examples, the base station and UE may set their respective connection response windows after the UE transmits connections requests in a set of consecutive transmission opportunities. In some examples, the base station and UE may set their respective connection response windows based at least in part on a first available transmission opportunity. In some examples, the UE may include an indication of a position in a transmission sequence in the connection response, and the base station (Continued)

may set the UE connection response window based at least in part on the indication.

19 Claims, 26 Drawing Sheets

(56) References Cited

U.S. PATENT DOCUMENTS

| | | | | |
|---|---|---|---|---|
| 2014/0112254 A1* | 4/2014 | Lindoff | ............... | H04W 74/002 |
| | | | | 370/328 |
| 2015/0117374 A1* | 4/2015 | Wu | ................... | H04W 74/0891 |
| | | | | 370/329 |
| 2016/0353440 A1* | 12/2016 | Lee | ................... | H04W 72/0453 |
| 2017/0231011 A1* | 8/2017 | Park | .................... | H04W 74/006 |
| 2018/0227958 A1* | 8/2018 | Xiong | ............... | H04W 74/0833 |
| 2020/0413395 A1* | 12/2020 | Chen | ................. | H04W 74/0833 |

OTHER PUBLICATIONS

International Search Report and Written Opinion—PCT/US2019/019957—ISA/EPO—dated May 6, 2019.

ZTE et al., "Remaining Details of RACH Procedure", 3GPP Draft; R1-1719346, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017, Nov. 18, 2017 (Nov. 18, 2017), XP051369275, 30 Pages, Retrieved from the Internet: URL:http://www.3gpp.org/ftp/tsg%5Fran/WG1%5FRL1/TSGR1%5F91/Docs/ [retrieved on Nov. 18, 2017], Figures 1-14, Sections 2-10, Section 8,Sections 7.2-7.5, 7.8-7.11; p. 7-p. 18.

\* cited by examiner

RANDOM ACCESS RESPONSE WINDOW AMBIGUITY FOR MULTIPLE MESSAGE1 TRANSMISSIONS

CROSS REFERENCES

The present application for patent claims the benefit of U.S. Provisional Patent Application No. 62/669,265 by ISLAM, et al., entitled "RANDOM ACCESS RESPONSE WINDOW AMBIGUITY FOR MULTIPLE MESSAGE1 TRANSMISSIONS," filed May 9, 2018, assigned to the assignee hereof, and expressly incorporated herein.

BACKGROUND

The following relates generally to wireless communication, and more specifically to random access response (RAR) window ambiguity for multiple message1 transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples, a wireless communications system may include a base station and a UE that may communicate over a random access channel (RACH). When the UE has data to transmit over the RACH, the UE may transmit a connection request during a transmission opportunity. The connection request may be, for example, a random access preamble transmission such as a RACH message1 (MSG1). The base station may receive and decode the connection request and transmit a connection response. The connection response may identify resources (e.g., time and frequency resources) that the UE may use for subsequent transmissions. The connection response may be, for example, a RACH message2 (MSG2). The UE may use the resources to transmit uplink data (e.g., a RACH message3 (MSG3)).

In some examples, the base station and UE may use a connection response window which may be, for example, a RAR window. The UE may set a UE connection response window upon transmitting the connection request. The UE may not transmit another connection request until expiration of the UE connection response window. If the UE does not receive the connection response prior to the expiration of the UE connection response window, the UE may assume that the base station did not receive the connection request, and may transmit another connection request.

In order to ensure that the UE receives the connection response prior to the expiration of the UE connection response window, the base station may set a base station connection response window that aligns with the UE connection response window. Upon receiving and decoding the connection request, the base station sets the base station connection response window. The base station transmits the connection response to the UE prior to the expiration of the base station connection response window (and thus the aligned UE connection response window).

SUMMARY

The described techniques relate to improved methods, systems, devices, or apparatuses that support random access response window ambiguity for multiple message1 transmissions. Generally, the described techniques provide for aligning connection response windows at a user equipment (UE) and a base station when the UE transmits multiple connection requests during the connection response window. The UE may transmit two or more connection requests prior to expiration of a UE connection response window. The UE connection response window may be, for example, a random access response (RAR) window. In some examples, the UE may re-set a UE connection response window each time the UE transmits a connection request. In some examples, the base station and UE may set their respective connection response windows after the UE transmits connection requests in a set of consecutive transmission opportunities. In some examples, the base station and UE may set their respective connection response windows based at least in part on a first available transmission opportunity. In some examples, the UE may include an indication of a position in a transmission sequence in the connection response, and the base station may set the UE connection response window based at least in part on the indication. The base station may transmit a connection response based at least in part on the connection request prior to the expiration of the base station connection response window.

A method of wireless communication is described. The method may include transmitting, by a UE, a first connection request, setting a connection response window based on the first connection request, transmitting a second connection request prior to an expiration of the connection response window, re-setting the connection response window based on the second connection message, receiving a connection response prior to an expiration of the reset connection response window, and transmitting uplink data based on the connection response.

An apparatus for wireless communication is described. The apparatus may include a processor, memory in electronic communication with the processor, and instructions stored in the memory. The instructions may be executable by the processor to cause the apparatus to transmit, by a UE, a first connection request, set a connection response window based on the first connection request, transmit a second connection request prior to an expiration of the connection response window, re-set the connection response window based on the second connection message, receive a connection response prior to an expiration of the reset connection response window, and transmit uplink data based on the connection response.

Another apparatus for wireless communication is described. The apparatus may include means for transmitting, by a UE, a first connection request, setting a connection response window based on the first connection request, transmitting a second connection request prior to an expiration of the connection response window, re-setting the connection response window based on the second connection message, receiving a connection response prior to an expiration of the reset connection response window, and transmitting uplink data based on the connection response.

A non-transitory computer-readable medium storing code for wireless communication is described. The code may include instructions executable by a processor to transmit, by a UE, a first connection request, set a connection response window based on the first connection request, transmit a second connection request prior to an expiration of the connection response window, re-set the connection response window based on the second connection message, receive a connection response prior to an expiration of the reset connection response window, and transmit uplink data based on the connection response.

Some examples of the method, apparatuses, and non-transitory computer-readable medium described herein may further include operations, features, means, or instructions for re-setting the connection response window includes re-setting a connection response counter associated with the connection response window, where the connection response counter counts time elapsed after starting the connection response window.

Some examples of the method, apparatuses, and non-transitory computer-readable medium described herein may further include operations, features, means, or instructions for re-setting the connection response window each time an additional connection response message may be transmitted prior to the expiration of the connection response window.

In some examples of the method, apparatuses, and non-transitory computer-readable medium described herein, receiving a connection response may include operations, features, means, or instructions for receiving a first connection response in response to the first connection request and decoding the first connection response, where the second connection request may be transmitted before the first connection response may be decoded.

In some examples of the method, apparatuses, and non-transitory computer-readable medium described herein, the uplink data may be transmitted based on the first connection response.

Some examples of the method, apparatuses, and non-transitory computer-readable medium described herein may further include operations, features, means, or instructions for receiving a second connection response based on the second connection request, where the uplink data may be transmitted based on the second connection response.

In some examples of the method, apparatuses, and non-transitory computer-readable medium described herein, the connection response window includes a RAR window.

In some examples of the method, apparatuses, and non-transitory computer-readable medium described herein, the connection response includes a RAR.

In some examples of the method, apparatuses, and non-transitory computer-readable medium described herein, the connection response identifies resources for an uplink data transmission by the UE.

In some examples of the method, apparatuses, and non-transitory computer-readable medium described herein, the connection response window includes a time period.

In some examples of the method, apparatuses, and non-transitory computer-readable medium described herein, the time period may be configured based on a master information block (MIB), remaining minimum system information (RMSI), open systems interconnection (OSI), DCI, a RRC message, a handover message, or a combination thereof.

In some examples of the method, apparatuses, and non-transitory computer-readable medium described herein, the connection response window includes a number of available random access resources.

In some examples of the method, apparatuses, and non-transitory computer-readable medium described herein, the first connection request includes a first random access preamble transmission and the second connection request includes a second random access preamble transmission.

In some examples of the method, apparatuses, and non-transitory computer-readable medium described herein, the first connection request may be transmitted using a first transmission beam, and the second connection request may be transmitted using a second transmission beam.

In some examples of the method, apparatuses, and non-transitory computer-readable medium described herein, the uplink data includes a RRC connection request.

In some examples of the method, apparatuses, and non-transitory computer-readable medium described herein, the uplink data includes a RACH MSG3.

In some examples of the method, apparatuses, and non-transitory computer-readable medium described herein, the connection request includes a random access preamble transmission.

A method of wireless communication is described. The method may include receiving, at a base station, a first connection request from a UE, transmitting a first connection response based on the first connection request, receiving a second connection request from the UE after transmitting the first connection response, and refraining from transmitting a second connection response in response to the second connection request.

An apparatus for wireless communication is described. The apparatus may include a processor, memory in electronic communication with the processor, and instructions stored in the memory. The instructions may be executable by the processor to cause the apparatus to receive, at a base station, a first connection request from a UE, transmit a first connection response based on the first connection request, receive a second connection request from the UE after transmitting the first connection response, and refrain from transmitting a second connection response in response to the second connection request.

Another apparatus for wireless communication is described. The apparatus may include means for receiving, at a base station, a first connection request from a UE, transmitting a first connection response based on the first connection request, receiving a second connection request from the UE after transmitting the first connection response, and refraining from transmitting a second connection response in response to the second connection request.

A non-transitory computer-readable medium storing code for wireless communication is described. The code may include instructions executable by a processor to receive, at a base station, a first connection request from a UE, transmit a first connection response based on the first connection request, receive a second connection request from the UE after transmitting the first connection response, and refrain from transmitting a second connection response in response to the second connection request.

In some examples of the method, apparatuses, and non-transitory computer-readable medium described herein, the first connection request includes a first random access preamble transmission and the second connection request includes a second random access preamble transmission.

In some examples of the method, apparatuses, and non-transitory computer-readable medium described herein, the first connection response includes a RAR.

In some examples of the method, apparatuses, and non-transitory computer-readable medium described herein, the first connection response identifies resources for a data transmission by the UE.

A method of wireless communication is described. The method may include receiving, at a base station, a first connection request from a UE, transmitting a first connection response based on the first connection request, receiving a second connection request from the UE after transmitting the first connection response, setting a connection response window based on the first connection request, and transmitting a second connection response in response to the second connection request prior to an expiration of the connection response window.

An apparatus for wireless communication is described. The apparatus may include a processor, memory in electronic communication with the processor, and instructions stored in the memory. The instructions may be executable by the processor to cause the apparatus to receive, at a base station, a first connection request from a UE, transmit a first connection response based on the first connection request, receive a second connection request from the UE after transmitting the first connection response, set a connection response window based on the first connection request, and transmit a second connection response in response to the second connection request prior to an expiration of the connection response window.

Another apparatus for wireless communication is described. The apparatus may include means for receiving, at a base station, a first connection request from a UE, transmitting a first connection response based on the first connection request, receiving a second connection request from the UE after transmitting the first connection response, setting a connection response window based on the first connection request, and transmitting a second connection response in response to the second connection request prior to an expiration of the connection response window.

A non-transitory computer-readable medium storing code for wireless communication is described. The code may include instructions executable by a processor to receive, at a base station, a first connection request from a UE, transmit a first connection response based on the first connection request, receive a second connection request from the UE after transmitting the first connection response, set a connection response window based on the first connection request, and transmit a second connection response in response to the second connection request prior to an expiration of the connection response window.

In some examples of the method, apparatuses, and non-transitory computer-readable medium described herein, the first connection request includes a first random access preamble transmission and the second connection request includes a second random access preamble transmission.

In some examples of the method, apparatuses, and non-transitory computer-readable medium described herein, the connection response window includes a RAR window.

In some examples of the method, apparatuses, and non-transitory computer-readable medium described herein, the first connection response includes a RAR.

In some examples of the method, apparatuses, and non-transitory computer-readable medium described herein, the first connection response identifies resources for a data transmission by the UE.

In some examples of the method, apparatuses, and non-transitory computer-readable medium described herein, the connection response window includes a time period.

Some examples of the method, apparatuses, and non-transitory computer-readable medium described herein may further include operations, features, means, or instructions for transmitting time period configuration information for a UE connection response window in a MIB, RMSI, OSI, DCI, a RRC message, a handover message, or a combination thereof.

In some examples of the method, apparatuses, and non-transitory computer-readable medium described herein, the connection response window includes a number of available random access resources.

A method of wireless communication is described. The method may include receiving, at a base station, a first connection request from a UE, setting up a connection response window based on the first connection request, determining a next random access transmission opportunity for the UE, and refraining from transmitting a first connection response during an exclusion period preceding the next random access transmission opportunity within the connection response window.

An apparatus for wireless communication is described. The apparatus may include a processor, memory in electronic communication with the processor, and instructions stored in the memory. The instructions may be executable by the processor to cause the apparatus to receive, at a base station, a first connection request from a UE, set up a connection response window based on the first connection request, determine a next random access transmission opportunity for the UE, and refrain from transmitting a first connection response during an exclusion period preceding the next random access transmission opportunity within the connection response window.

Another apparatus for wireless communication is described. The apparatus may include means for receiving, at a base station, a first connection request from a UE, setting up a connection response window based on the first connection request, determining a next random access transmission opportunity for the UE, and refraining from transmitting a first connection response during an exclusion period preceding the next random access transmission opportunity within the connection response window.

A non-transitory computer-readable medium storing code for wireless communication is described. The code may include instructions executable by a processor to receive, at a base station, a first connection request from a UE, set up a connection response window based on the first connection request, determine a next random access transmission opportunity for the UE, and refrain from transmitting a first connection response during an exclusion period preceding the next random access transmission opportunity within the connection response window.

In some examples of the method, apparatuses, and non-transitory computer-readable medium described herein, refraining from transmitting the first connection response during the exclusion period may include operations, features, means, or instructions for transmitting the first connection response prior to the exclusion period.

Some examples of the method, apparatuses, and non-transitory computer-readable medium described herein may further include operations, features, means, or instructions for receiving a second connection request from the UE during the next random access transmission opportunity, refraining from transmitting the first connection response and transmitting a second connection response based on the second connection request.

In some examples of the method, apparatuses, and non-transitory computer-readable medium described herein, the first connection request includes a first random access preamble transmission.

A method of wireless communication is described. The method may include identifying, by a UE, a set of random access transmission opportunities, selecting a subset of consecutive random access transmission opportunities from the set of random access transmission opportunities, and transmitting a connection request in each of the subset of consecutive random access transmission opportunities.

An apparatus for wireless communication is described. The apparatus may include a processor, memory in electronic communication with the processor, and instructions stored in the memory. The instructions may be executable by the processor to cause the apparatus to identify, by a UE, a set of random access transmission opportunities, select a subset of consecutive random access transmission opportunities from the set of random access transmission opportunities, and transmit a connection request in each of the subset of consecutive random access transmission opportunities.

Another apparatus for wireless communication is described. The apparatus may include means for identifying, by a UE, a set of random access transmission opportunities, selecting a subset of consecutive random access transmission opportunities from the set of random access transmission opportunities, and transmitting a connection request in each of the subset of consecutive random access transmission opportunities.

A non-transitory computer-readable medium storing code for wireless communication is described. The code may include instructions executable by a processor to identify, by a UE, a set of random access transmission opportunities, select a subset of consecutive random access transmission opportunities from the set of random access transmission opportunities, and transmit a connection request in each of the subset of consecutive random access transmission opportunities.

Some examples of the method, apparatuses, and non-transitory computer-readable medium described herein may further include operations, features, means, or instructions for setting a connection response window based on a last of the consecutive random access transmission opportunities.

Some examples of the method, apparatuses, and non-transitory computer-readable medium described herein may further include operations, features, means, or instructions for selecting a size of the subset of consecutive random access transmission opportunities.

Some examples of the method, apparatuses, and non-transitory computer-readable medium described herein may further include operations, features, means, or instructions for receiving, from a base station, an indication of a size of the subset of consecutive random access transmission opportunities.

In some examples of the method, apparatuses, and non-transitory computer-readable medium described herein, the connection request includes a first random access preamble transmission.

In some examples of the method, apparatuses, and non-transitory computer-readable medium described herein, the connection response window includes RAR window.

In some examples of the method, apparatuses, and non-transitory computer-readable medium described herein, the connection response window includes a time period.

In some examples of the method, apparatuses, and non-transitory computer-readable medium described herein, the time period may be configured based on a MIB, RMSI, OSI, DCI, a RRC message, a handover message, or a combination thereof.

In some examples of the method, apparatuses, and non-transitory computer-readable medium described herein, the connection response window includes a number of available random access resources.

In some examples of the method, apparatuses, and non-transitory computer-readable medium described herein, a first connection request transmitted in a first of the consecutive transmission opportunities may be transmitted using a first transmission beam and a second connection request transmitted in a second of the consecutive transmission opportunities may be transmitted using a second transmission beam.

A method of wireless communication is described. The method may include identifying, by a base station, a set of random access transmission opportunities associated with a UE, receiving at least one connection request from the UE during the set of random access transmission opportunities, setting a connection response window based on the at least one connection request, and transmitting a connection response prior to an expiration of the connection response window.

An apparatus for wireless communication is described. The apparatus may include a processor, memory in electronic communication with the processor, and instructions stored in the memory. The instructions may be executable by the processor to cause the apparatus to identify, by a base station, a set of random access transmission opportunities associated with a UE, receive at least one connection request from the UE during the set of random access transmission opportunities, set a connection response window based on the at least one connection request, and transmit a connection response prior to an expiration of the connection response window.

Another apparatus for wireless communication is described. The apparatus may include means for identifying, by a base station, a set of random access transmission opportunities associated with a UE, receiving at least one connection request from the UE during the set of random access transmission opportunities, setting a connection response window based on the at least one connection request, and transmitting a connection response prior to an expiration of the connection response window.

A non-transitory computer-readable medium storing code for wireless communication is described. The code may include instructions executable by a processor to identify, by a base station, a set of random access transmission opportunities associated with a UE, receive at least one connection request from the UE during the set of random access transmission opportunities, set a connection response window based on the at least one connection request, and transmit a connection response prior to an expiration of the connection response window.

Some examples of the method, apparatuses, and non-transitory computer-readable medium described herein may further include operations, features, means, or instructions for transmitting an indication of a size of a subset of the set of random access transmission opportunities available for transmission of the at least one connection request by the UE.

In some examples of the method, apparatuses, and non-transitory computer-readable medium described herein, the at least one connection request includes a first random access transmission preamble.

In some examples of the method, apparatuses, and non-transitory computer-readable medium described herein, the connection response window includes a RAR window.

In some examples of the method, apparatuses, and non-transitory computer-readable medium described herein, the connection response includes a RAR.

In some examples of the method, apparatuses, and non-transitory computer-readable medium described herein, the connection response identifies resources for a data transmission by the UE.

In some examples of the method, apparatuses, and non-transitory computer-readable medium described herein, the connection response window includes a time period.

Some examples of the method, apparatuses, and non-transitory computer-readable medium described herein may further include operations, features, means, or instructions for transmitting time period configuration information for a UE connection response window in a MIB, RMSI, OSI, DCI, a RRC message, a handover message, or a combination thereof.

In some examples of the method, apparatuses, and non-transitory computer-readable medium described herein, the connection response window includes a number of available random access resources.

A method of wireless communication is described. The method may include identifying, by a base station, a first random access transmission opportunity associated with a UE, setting a connection response window based on the identified first random access transmission opportunity, receiving a connection request from the UE during the connection response window, and transmitting a connection response prior to an expiration of the connection response window.

An apparatus for wireless communication is described. The apparatus may include a processor, memory in electronic communication with the processor, and instructions stored in the memory. The instructions may be executable by the processor to cause the apparatus to identify, by a base station, a first random access transmission opportunity associated with a UE, set a connection response window based on the identified first random access transmission opportunity, receive a connection request from the UE during the connection response window, and transmit a connection response prior to an expiration of the connection response window.

Another apparatus for wireless communication is described. The apparatus may include means for identifying, by a base station, a first random access transmission opportunity associated with a UE, setting a connection response window based on the identified first random access transmission opportunity, receiving a connection request from the UE during the connection response window, and transmitting a connection response prior to an expiration of the connection response window.

A non-transitory computer-readable medium storing code for wireless communication is described. The code may include instructions executable by a processor to identify, by a base station, a first random access transmission opportunity associated with a UE, set a connection response window based on the identified first random access transmission opportunity, receive a connection request from the UE during the connection response window, and transmit a connection response prior to an expiration of the connection response window.

Some examples of the method, apparatuses, and non-transitory computer-readable medium described herein may further include operations, features, means, or instructions for transmitting a handover message to the UE, where the handover message includes an indication of the first random access transmission opportunity.

In some examples of the method, apparatuses, and non-transitory computer-readable medium described herein, the connection request includes a first random access preamble transmission.

In some examples of the method, apparatuses, and non-transitory computer-readable medium described herein, the connection response window includes a RAR window.

In some examples of the method, apparatuses, and non-transitory computer-readable medium described herein, the connection response includes a RAR.

In some examples of the method, apparatuses, and non-transitory computer-readable medium described herein, the connection response identifies resources for a data transmission by the UE.

In some examples of the method, apparatuses, and non-transitory computer-readable medium described herein, the connection response window includes a time period.

In some examples of the method, apparatuses, and non-transitory computer-readable medium described herein, the time period may be configured based on a MIB, RMSI, OSI, DCI, a RRC message, a handover message, or a combination thereof.

In some examples of the method, apparatuses, and non-transitory computer-readable medium described herein, the connection response window includes a number of available random access resources.

A method of wireless communication is described. The method may include determining, by a UE, a connection response window and transmitting two or more connection requests during the connection response window, where each of the two or more connection requests includes an indication of a position in a transmission sequence.

An apparatus for wireless communication is described. The apparatus may include a processor, memory in electronic communication with the processor, and instructions stored in the memory. The instructions may be executable by the processor to cause the apparatus to determine, by a UE, a connection response window and transmit two or more connection requests during the connection response window, where each of the two or more connection requests includes an indication of a position in a transmission sequence.

Another apparatus for wireless communication is described. The apparatus may include means for determining, by a UE, a connection response window and transmitting two or more connection requests during the connection response window, where each of the two or more connection requests includes an indication of a position in a transmission sequence.

A non-transitory computer-readable medium storing code for wireless communication is described. The code may include instructions executable by a processor to determine, by a UE, a connection response window and transmit two or more connection requests during the connection response window, where each of the two or more connection requests includes an indication of a position in a transmission sequence.

In some examples of the method, apparatuses, and non-transitory computer-readable medium described herein, the indication of a transmission sequence includes a preamble sequence corresponding to the position in the transmission sequence.

Some examples of the method, apparatuses, and non-transitory computer-readable medium described herein may further include operations, features, means, or instructions for receiving, from a base station, a set of indications corresponding to different positions in a transmission sequence.

In some examples of the method, apparatuses, and non-transitory computer-readable medium described herein, each of the two or more connection requests include a random access preamble transmission.

In some examples of the method, apparatuses, and non-transitory computer-readable medium described herein, the connection response window includes a RAR window.

In some examples of the method, apparatuses, and non-transitory computer-readable medium described herein, the connection response window includes a time period.

Some examples of the method, apparatuses, and non-transitory computer-readable medium described herein may further include operations, features, means, or instructions for transmitting time period configuration information for a UE connection response window in a MIB, RMSI, OSI, DCI, a RRC message, a handover message, or a combination thereof.

In some examples of the method, apparatuses, and non-transitory computer-readable medium described herein, the connection response window includes a number of available random access resources.

In some examples of the method, apparatuses, and non-transitory computer-readable medium described herein, each of the two or more connection requests may be transmitted using a different transmission beam.

A method of wireless communication is described. The method may include receiving, at a base station, a connection request, where the connection request includes an indication of a position in a transmission sequence, determining, based on the indication of the position in the transmission sequence, a connection response window, and transmitting a connection response prior to an expiration of the connection response window.

An apparatus for wireless communication is described. The apparatus may include a processor, memory in electronic communication with the processor, and instructions stored in the memory. The instructions may be executable by the processor to cause the apparatus to receive, at a base station, a connection request, where the connection request includes an indication of a position in a transmission sequence, determine, based on the indication of the position in the transmission sequence, a connection response window, and transmit a connection response prior to an expiration of the connection response window.

Another apparatus for wireless communication is described. The apparatus may include means for receiving, at a base station, a connection request, where the connection request includes an indication of a position in a transmission sequence, determining, based on the indication of the position in the transmission sequence, a connection response window, and transmitting a connection response prior to an expiration of the connection response window.

A non-transitory computer-readable medium storing code for wireless communication is described. The code may include instructions executable by a processor to receive, at a base station, a connection request, where the connection request includes an indication of a position in a transmission sequence, determine, based on the indication of the position in the transmission sequence, a connection response window, and transmit a connection response prior to an expiration of the connection response window.

In some examples of the method, apparatuses, and non-transitory computer-readable medium described herein, the indication includes a preamble corresponding to the position in the transmission sequence.

Some examples of the method, apparatuses, and non-transitory computer-readable medium described herein may further include operations, features, means, or instructions for transmitting a set of indications of positions in a transmission sequence.

In some examples of the method, apparatuses, and non-transitory computer-readable medium described herein, the connection request includes a first random access preamble transmission.

In some examples of the method, apparatuses, and non-transitory computer-readable medium described herein, the connection response window includes a RAR window.

In some examples of the method, apparatuses, and non-transitory computer-readable medium described herein, the connection response window includes a time period.

In some examples of the method, apparatuses, and non-transitory computer-readable medium described herein, the time period may be configured based on a MIB, RMSI, OSI, DCI, a RRC message, a handover message, or a combination thereof.

In some examples of the method, apparatuses, and non-transitory computer-readable medium described herein, the connection response window includes a number of available random access resources.

DETAILED DESCRIPTION

A user equipment (UE) may transmit two or more connection requests prior to expiration of a connection response window. For example, the UE may be capable of transmitting using two or more transmission beams. Due, for example, to the orientation of the transmission beams, a base station may receive transmissions sent on some of the transmission beams but may not receive transmission sent on others of the transmission beams. Accordingly, the UE may transmit a first connection request on a first transmission beam and a second connection request on a second transmission beam, in case the base station cannot receive transmissions sent using the first transmission beam.

However, the transmission of multiple connection requests during a connection response window may pose a risk of additional latency in some cases. For example, the UE may transmit a first connection request using the first beam during a first transmission opportunity. The UE may set the UE connection response window from the first transmission opportunity. The base station may be unable to receive and/or decode the first connection request, and accordingly may not set the base station connection response window. The UE may then transmit a second connection request using a second transmission beam during a second transmission opportunity. The second transmission opportunity may occur prior to the expiration of the UE connection response window. The base station may receive and decode the second connection request, and set the base station connection response window from the second transmission opportunity. Thus, the base station connection response window may not be aligned with the UE connection response window (e.g., may extend significantly beyond the UE connection response window). Thus, the base station may transmit the connection response prior to the expiration of the base station connection response window, but the UE may receive the connection response after the expiration of the base station response window. Thus, the UE may ignore the connection request, initialize another base station response window, and transmit a new set of connection requests, which may cause an increase in latency. In order to mitigate the potential increase in latency, the base station and/or UE may implement one or more techniques to align the UE connection response window with the base station connection response window.

Aspects of the disclosure are initially described in the context of a wireless communications system. Aspects of the disclosure are further illustrated by and described with reference to apparatus diagrams, system diagrams, and flowcharts that relate to RAR window ambiguity for multiple message1 transmissions.

Figure 1:
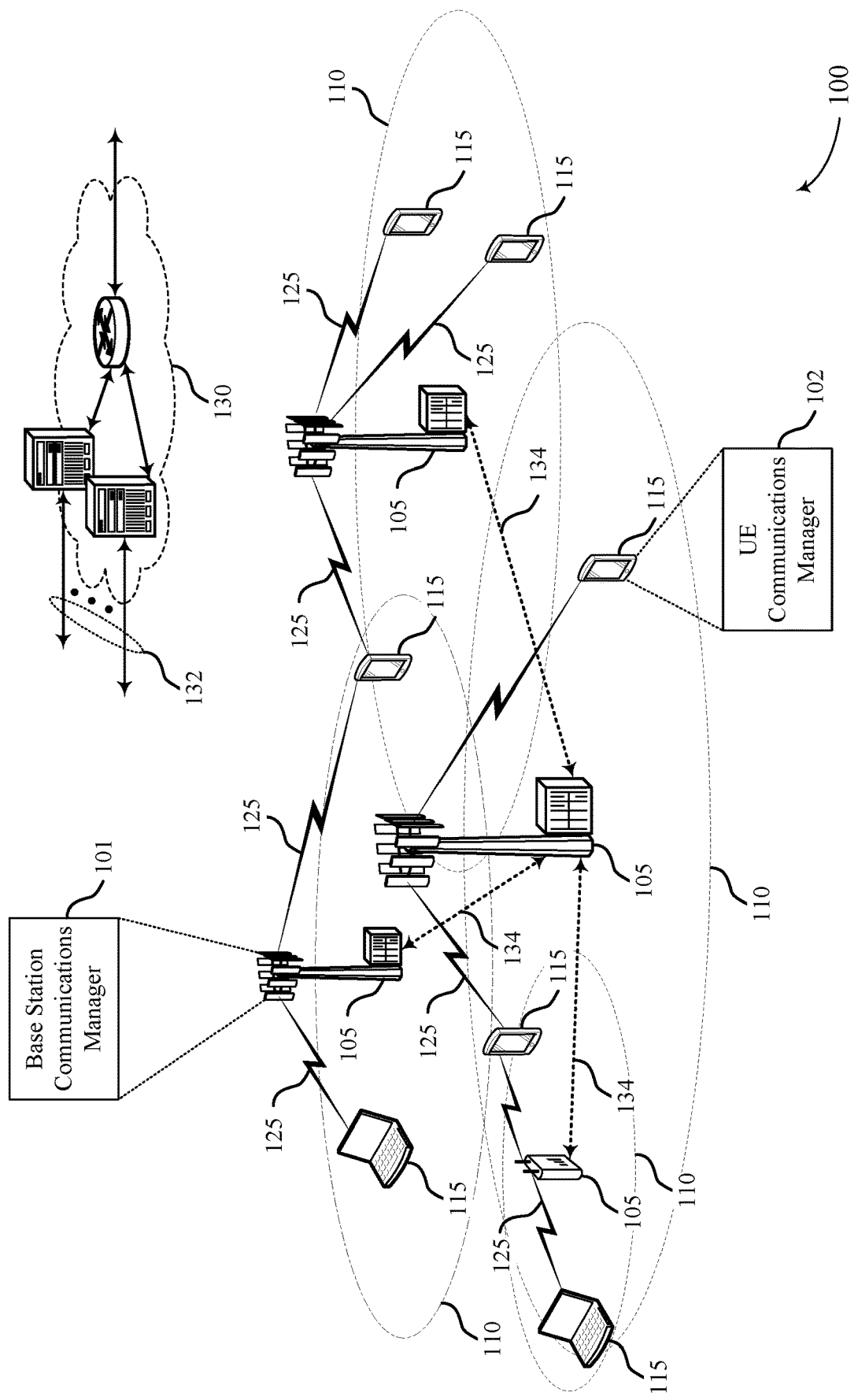
FIGS. 1 and 2 illustrate examples of a wireless communications system that supports random access response (RAR) window ambiguity for multiple message1 transmissions in accordance with aspects of the present disclosure.

FIG. 1 illustrates an example of a wireless communications system 100 that supports random access response (RAR) window ambiguity for multiple message1 transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a base station communications manager 101, which may be configured to set a base station connection response window. The base station connection response window may be, for example, a random access response (RAR) window.

The base station communications manager 101 may receive and decode a connection request. The connection request may be, for example, a random access preamble transmission such as a RACH MSG1. The base station communications manager 101 may set the base station connection response window based at least in part on receipt of the connection request, available transmission opportunities, content of the connection request, or a combination thereof. The base station communications manager 101 may generate a connection response based at least in part on the connection request. The connection response may be, for example, a RACH MSG2. The connection response may include grant information such as an indication of resources (e.g., time and frequency resources) that may be used by a UE 115 that transmitted the connection request for transmitting uplink (UL) data. The base station communications manager 101 may cause the base station 105 to transmit the connection response prior to the expiration of the base station connection response window.

In some examples, the base station communications manager 101 may initialize the base station connection response window upon receipt of the connection response (e.g., after decoding the connection response). In some cases, the base station communications manager 101 may receive a subsequent connection request after transmission of the connection response but prior to expiration of the base station connection response window. The base station communications manager 101 may be configured to ignore the subsequent connection request (e.g., not transmit a second connection response prior to the expiration of the base station connection response window). In some other examples, the base station communications manager 101 may be configured to transmit a second connection response prior to expiration of the base station connection response window. The grant information in the second connection response may be different than the grant information in the first connection response. In some other cases, the base station communications manager 101 may avoid such a situation by refraining from scheduling transmission of a connection response during an exclusion period prior to a transmission opportunity.

In some examples, the base station communications manager 101 may initialize the base station connection response window after a set of transmission opportunities during which a UE 115 may transmit multiple connection requests. The base station communications manager 101 may initialize the base station connection response window based on a last transmission opportunity in the set of transmission opportunities (e.g., after receipt of the last random access channel (RACH) preamble of the set of transmission opportunities). In some examples, the base station communications manager 101 may non-coherently combine two or more of the connection requests transmitted during the set of transmission opportunities. In some examples, the base station communications manager 101 may select a size of the set of consecutive transmission opportunities during which a UE 115 may transmit connection requests, and may transmit an indication of the selected size to the UE 115.

In some examples, the base station communications manager 101 may initialize the base station connection response window based at least in part on a first available transmission opportunity, regardless of whether the base station 105 receives a connection request in that transmission opportunity, and regardless of whether the UE 115 transmits a connection request in that transmission opportunity. In some examples, the base station communications manager 101 may transmit a handover command to a UE 115. The handover command may include an indication of available transmission resources (e.g., contention free random access (CFRA) opportunities). The available transmission resources may be, for example, a fixed set of slots in each frame, subframe, or the like. The base station communications manager 101 may receive and decode a connection request during the first available transmission opportunity or a later transmission opportunity prior to the expiration of the base station connection response window. The base station communications manager 101 may schedule transmission of a connection response prior to the expiration of the base station connection response window.

In some examples, the base station communications manager 101 may initialize the base station connection response window based at least in part on the content of a received connection request. For example, the base station communications manager 101 may configure a UE 115 with a set of indications of positions in a transmission sequence. The indications may be, for example, preamble sequences corresponding to a position in a transmission sequence. The base station communications manager 101 may receive and decode a first connection request. The first connection request may include an indication of a position in a transmission sequence. For example, the first connection request may include a preamble sequence indicating the position. The base station communications manager 101 may determine the position of the first connection request based at least in part on the indication. The base station communications manager 101 may determine the location of the first position based at least in part on the position of the first connection request. The base station communications manager 101 may initialize the base station connection response window based at least in part on the location of the first position. The base station communications manager 101 may schedule transmission of a connection response prior to the expiration of the base station connection response window.

UEs 115 may include a UE communications manager 102, which may be configured to set a UE connection response window. The UE connection response window may be, for example, a RAR window.

The UE communications manager 102 may transmit multiple connection requests during a UE connection response window. Each connection request may be, for example, a random access preamble transmission such as a RACH MSG1. The UE communications manager 102 may be set the UE connection response window based at least in part on transmission of a connection request, available transmission opportunities, or a combination thereof.

In some examples, the UE communications manager 102 may initialize a UE connection response window upon transmission of a first connection request. The UE communications manager 102 schedule transmission of a second connection request prior to the expiration of the first connection request. The UE communications manager 102 may re-set the UE connection response window based at least in part on the transmission of the second connection request (e.g., by re-setting a UE connection response window). The UE communications manager 102 may continue to re-set the UE connection response window upon each transmission of a connection request prior to expiration of the UE connection response window.

In some cases, the UE communications manager 102 may receive a connection response from a base station 105. However, the UE communications manager 102 may not decode the connection response until after transmission of another connection request. In some examples, the UE communications manager 102 may be configured to transmit UL data using grant information included in the received connection response without waiting for a subsequent connection response. In some other examples, the UE communications manager 102 may be configured to ignore the grant information in the received connection response (e.g., to not transmit using the time and frequency resources identified in the received connection response). The UE communications manager 102 may receive a second connection response prior to expiration of the UE connection response window, and may transmit UL data using the grant information in the second connection response.

In some examples, the UE communications manager 102 may be configured to identify a set of consecutive transmission opportunities that may be used for transmitting connection requests. The UE communications manager 102 may schedule transmission of connection requests in a consecutive subset of the set of consecutive transmission opportunities. In some examples, the UE communications manager 102 may receive an indication of the size of the subset of consecutive transmission opportunities from a base station 105. In some other examples, the UE communications manager 102 may select the size of the subset of consecutive transmission opportunities. The UE communications manager 102 may initialize the UE connection response window based at least in part on a last transmission opportunity of the set or sub-set of transmission opportunities. In some examples, the UE communications manager 102 may initialize the UE connection response window upon transmission of a last RACH preamble.

In some examples, the UE communications manager 102 may be configured to initialize the UE connection response window based at least in part on the first available transmission opportunity, regardless of whether the UE communications manager 102 schedules transmission of a connection request during that transmission opportunity. The UE communications manager 102 may identify a first available transmission opportunity (e.g., a first CFRA opportunity). In some examples, the UE communications manager 102 may receive an indication of the available transmission opportunities from a base station 105 (e.g., in a handover message). The available transmission resources may be a fixed set of slots in each frame, subframe, or the like. The UE communications manager 102 may initialize the UE connection response window based at least in part on the identified first available transmission opportunity. The UE communications manager 102 may schedule transmission of one or more connection requests during the UE connection response window.

In some examples, the UE communications manager 102 may be configured to initialize the UE connection response window based at least in part on the transmission of a first connection request. The UE communications manager 102 may receive a set of indications of positions in a transmission sequence (e.g., from a base station 105). The UE communications manager 102 may transmit a first connection request, and may initialize the UE connection response window based thereon. The UE communications manager 102 may schedule transmission of one or more connection requests during the UE connection response window. Each connection request may include an indication of a position in the transmission sequence. For example, each connection request may include a preamble sequence corresponding to a position in the transmission sequence, such that the first connection request includes a preamble sequence corresponding to a first position and the second connection request includes a preamble sequence corresponding to a second position. In some examples, the UE communications manager 102 may be configured to schedule transmission of connection requests only during consecutive available transmission opportunities (e.g., consecutive CFRA opportunities).

Figure 2:
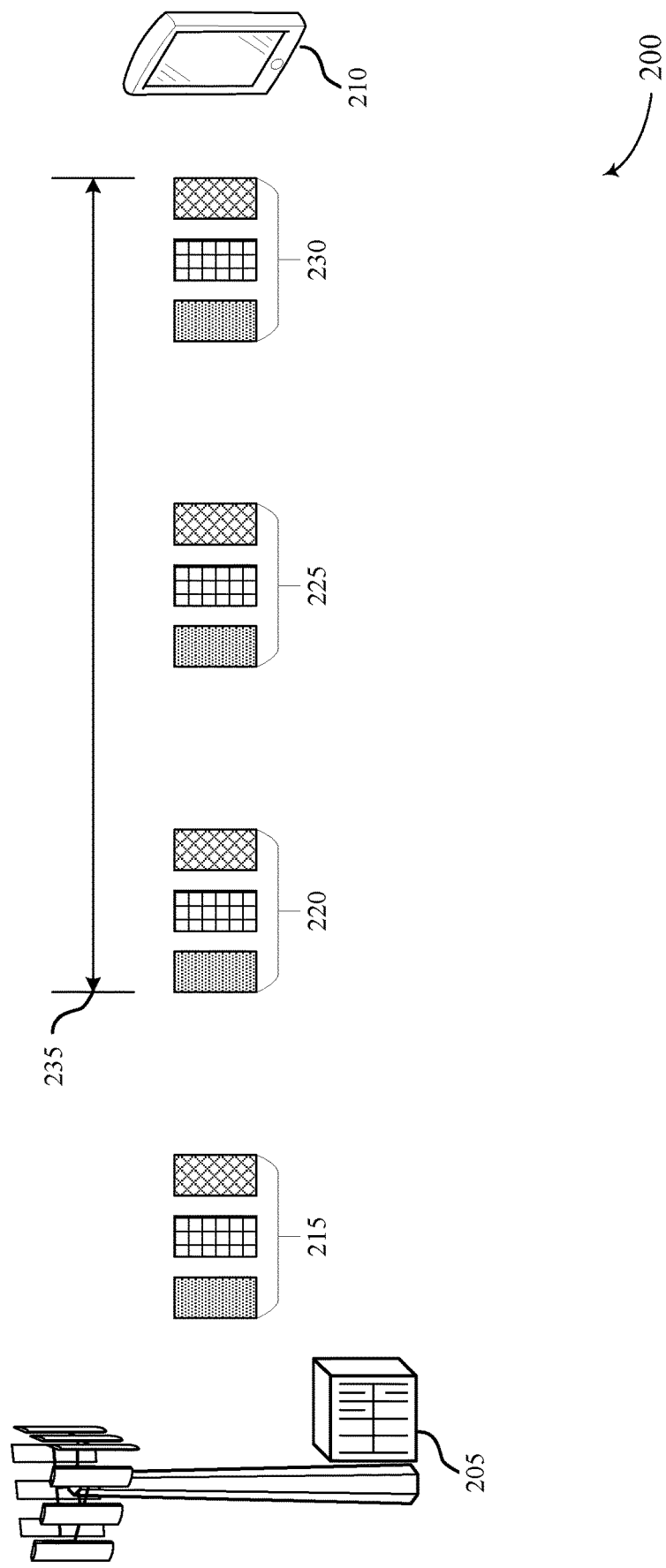

FIG. 2 illustrates an example of a wireless communications system 200 that supports RAR window ambiguity for multiple message1 transmissions in accordance with various aspects of the present disclosure. In some examples, the wireless communications system 200 may implement aspects of wireless communication system 100. The wireless communications system 200 may include a base station 205 and a UE 210. The base station 205 may be an example of aspects of base station 105 as described with reference to FIG. 1. The UE 210 may be an example of aspects of UE 115 as described with reference to FIG. 1.

The UE 210 may communicate with the base station 205 via a RACH. The UE 210 may establish communication with the base station 205 over the RACH using a RACH procedure. The UE 210 may transmit a connection request to the base station 205. In some examples, the connection request may be a RACH request included in a random access preamble transmission such as a RACH MSG1. The base station 205 may receive and decode the connection request, and prepare a connection response. In some examples, the connection response may be a RACH response included in a RACH MSG2. The connection response may include an indication of resources that the UE 210 may use for transmissions over the RACH. The resources may be time and frequency resources. The UE 210 may utilize the indicated resources to transmit uplink data, which may be an RRC message included in a RACH MSG3.

In some examples, the UE 210 may transmit a connection request that the base station 205 does not receive or is unable to decode (e.g., due to interference or the use of a transmission beam not aligned with the reception beams of the base station 205). The UE 210 may use a connection response window to address the possibility of non-reception by the base station 205. The UE 210 may wait until the connection response window expires before re-transmitting the same connection request using the same transmission beam. The UE 210 may also ignore any connection response transmitted by the base station 205 after the expiration of the connection response window. In order to transmit the connection response prior to expiration of the UE connection response window, the base station may also have a base station connection response window. The connection response window may be a RAR window. The connection response window may be tracked using a RAR window counter. In some examples, the counter may correspond to a time period. The time period may be configured via a MIB, an RMSI, an OSI, a DCI, other system information, an RRC message, a handover message, or a combination thereof. In some other examples, the counter may correspond to a number of available resources (e.g., CFRA resources).

In some examples, the UE 210 may transmit multiple connection requests without waiting for the expiration of the connection response window. For example, the UE 210 may be capable of transmitting using multiple transmission beams. The UE 210 may transmit using a first transmission beam during a first transmission opportunity, and may transmit using a second transmission beam during a second transmission opportunity. The UE 210 may not wait for the expiration of an RAR window corresponding to the first transmission before sending the second transmission. However, the transmission of multiple connection requests may cause misalignment between the UE connection response window and the base station response window. For example, the UE 210 may transmit a first connection request during the first transmission opportunity 215. The UE 210 may set its connection response window based on the transmission of the first connection request. The UE connection response window may end after the third transmission opportunity 225. However, the base station 205 may be unable to receive or decode the first connection request (e.g., due to the orientation of the transmission beam and/or the presence of interference). Accordingly, the base station 205 may not set the base station connection response window based on the first connection request.

The UE 210 may then transmit a second connection request during the second transmission opportunity 220. The base station 205 may receive and decode the second connection request. The base station 205 may set the base station connection response window 235 based on the second connection request, which the base station 205 may understand to be the first connection request. This may result in a misalignment between the UE connection response window and the base station connection response window.

The misalignment between the connection response windows may cause unnecessary latency in the wireless communications system 200. For example, the base station 205 may prepare a connection response based at least in part on the second connection request. The base station 205 may determine, based on the base station connection response window 235, that the connection response will be timely received by the UE 210 as long as the connection response is transmitted prior to the fourth transmission opportunity 230. Accordingly, the base station 205 may transmit the connection response between the third transmission opportunity 225 and the fourth transmission opportunity 230. However, because the UE 210 set the UE connection response window based on the first connection request, the UE 210 will not receive the connection response until after the UE connection response window expires. The UE 210 may ignore the connection response, which may cause the process to be repeated. In order to mitigate the latency caused by misalignment of the RAR windows, the base station 205 and/or UE 210 may implement one or more techniques to properly align the RAR windows.

In some examples, the UE 210 may re-set the UE connection response window each time a connection request is transmitted. For example, the UE 210 may transmit a first connection request (e.g., a first RACH MSG1) during a first transmission opportunity 215. The UE 210 may initialize a UE connection response window (e.g., a UE RAR window) based at least in part on the transmission of the first connection request. In some examples, the UE 210 may initialize the UE connection response window by initializing a UE RAR window counter.

The UE 210 may transmit a second connection request (e.g., a second RACH MSG1) during a second transmission opportunity 220. The UE 210 may re-set the UE connection response window based at least in part on the transmission of the second connection request. In some examples, the UE 210 may re-set the UE connection response window by re-setting the UE RAR window counter.

The base station 205 may set the base station connection response window (e.g., a base station RAR window) based on a received connection request. For example, the base station 205 may receive and decode the second connection request during the second transmission opportunity 220. The base station 205 may set the base station connection response window 235 based at least in part on the second connection request (e.g., by setting a base station connection response window counter). The base station 205 may generate a first connection response based at least in part on the second connection request, and may transmit the first connection response prior to the expiration of the base station connection response window 235.

Because the UE 210 re-sets the UE connection response window during the second transmission opportunity 220, the base station connection response window may correspond to the UE connection response window, and the likelihood of misalignment may be mitigated. In some examples, the UE 210 may re-set the UE connection response window again during a subsequent transmission opportunity (e.g., the third transmission opportunity 225). In such examples, the UE connection response window may extend beyond the base station connection response window, such that a timely-sent connection response (e.g., a MSG2 transmitted by the base station 205 prior to the expiration of the base station connection response window 235) will be received prior to expiration of the UE connection response window.

In some examples, the base station 205 may transmit the connection response prior to a transmission opportunity, such as third transmission opportunity 225. However, the UE 210 may not decode the connection response until after the third transmission opportunity 225. The UE 210 may transmit a third connection request during the third transmission opportunity 225. The base station 205 may determine how to respond to a connection request received during a transmission opportunity following the transmission of a connection response.

In some examples, the base station 205 may ignore the third connection request (e.g., may determine not to transmit a connection response based at least in part on the third connection request). The UE 210 may not wait for another connection response. Instead, the UE 210 may use grant information provided in the first connection response to transmit uplink data. In some other examples, the base station 205 may generate a second connection response based at least in part on the third connection request. The base station 205 may not re-set the base station connection response window 235. The base station 205 may transmit the second connection response prior to the expiration of the base station connection response window 235. The UE 210 may not transmit any additional connection requests prior to the expiration of the UE connection response window, and may ignore the first connection response (e.g., may determine not to transmit uplink data using grant information provided in the first connection response). The UE 210 may transmit uplink data using grant information provided in the second connection response.

In some examples, the base station 205 may be configured to avoid transmitting a connection response during an exclusion period prior to each transmission opportunity. The exclusion period may be determined based at least in part on a length of time for the UE 210 to decode a connection response. For example, the exclusion period may be set to a period of time greater than the length of time for the UE 210 to decode a connection response. Use of such an exclusion period may mitigate the likelihood that the UE 210 will receive a connection response prior to a transmission opportunity but unable to decode the connection response until after the transmission opportunity. In some examples, the UE 210 may be configured to transmit multiple connection requests in consecutive transmission opportunities. The base station 205 and the UE 210 may set their respective connection response windows based at least in part on a last transmission opportunity of the consecutive transmission opportunities.

The UE 210 may identify a set of transmission opportunities. The set of transmission opportunities may include, for example, first transmission opportunity 215 and second transmission opportunity 220. The UE 210 may transmit connection requests in one or more transmission opportunities in the set of transmission opportunities. For example, the UE 210 may transmit a first connection response during the first transmission opportunity 215 and a second connection response during the second transmission opportunity 220. The UE 210 may set the UE connection response window based at least in part on the last of the transmission opportunities in the set (or sub-set) of transmission opportunities (e.g., second transmission opportunity 220). In some examples, the UE connection response window may be initialized after the end of the last preamble of second transmission opportunity 220. Likewise, the base station 205 may set the base station connection response window 235 based at least in part on the last of the transmission opportunities in the set (or sub-set) of transmission opportunities (e.g., second transmission opportunity 220). In some examples, the base station connection response window 235 may be initialized after the end of the last preamble of second transmission opportunity 220.

The base station 205 may receive and decode one or more of the connection requests. The base station 205 may not transmit a connection response until the base station connection response window is initialized. For example, even if the base station 205 receives and decodes a first connection request transmitted during the first transmission opportunity 215, the base station 205 may not transmit a responsive connection response until after the second transmission opportunity 220 (when the base station connection response window 235 is initialized).

In some examples, the base station 205 may non-coherently combine the connection requests transmitted during the set of transmission opportunities. For example, the base station 205 may combine consecutive PRACH preambles. In some examples, the base station 205 may select a size of the set of transmission opportunities. The base station may transmit an indication of the size of the set of transmission opportunities to the UE 210. In some other examples, the UE 210 may select the size of the set of transmission opportunities. The UE 210 may terminate transmission of multiple connection requests if the UE 210 anticipates that one or more of the transmitted connection requests is likely to reach the base station 205.

In some examples, the base station 205 and the UE 210 may be configured to initialize their respective connection response windows based at least in part on a first available transmission opportunity (e.g., a first CFRA opportunity). For example, the UE 205 may identify a first available transmission opportunity, which may be second transmission opportunity 220. In some examples, the base station 205 may transmit a handover message indicating the first available transmission opportunity to the UE 210. In some examples, the available CFRA resources may be a fixed set of slots in each frame, subframe, or the like. The UE 210 may set the UE connection response window based at least in part on the second transmission opportunity 220, regardless of whether the UE 210 transmits a connection request during the second transmission opportunity 220. The base station 205 likewise may set the base station connection response window 235 based at least in part on the second transmission opportunity 220, regardless of whether the base station 205 receives and/or decodes a connection request during the second transmission opportunity 220.

The UE 210 may not transmit a connection request during the second transmission opportunity 220. The UE 210 may transmit a first connection request during the third transmission opportunity 225. The base station 205 may receive and decode the first connection request, and may generate a first connection response based at least in part on the first connection request. The base station 205 may transmit the first connection response to the UE 210 prior to the expiration of the base station connection response window 235.

In some examples, the UE 210 may include an indication of a position in a transmission sequence in the connection request, and the base station 205 may set the base station connection window based at least in part on the indication of the position in the transmission sequence. In a first example, the UE 210 may not transmit a connection request in a first transmission opportunity 215, and may transmit a first connection request in a second transmission opportunity 220. The first connection request may include an indication of a position in a transmission sequence (e.g., an indication that the first connection request is the first connection request in the transmission sequence). In some examples, the base station 205 may configure the UE 210 with a set of indications, which may be a set of preamble sequences. Each of the indications may correspond to a position in the indication. For example, the first connection request may include a preamble corresponding to the first position. The UE 210 may set the UE connection response window based at least in part on the first connection request. The base station 205 may receive and decode the first connection request. The base station 205 may set the base station connection response window 235 based at least in part on the indication of the position in the transmission sequence. For example, the base station 205 may determine that the preamble sequence in the first connection request indicates a first position. The base station 205 may set the base station connection response window 235 based at least in part on the current transmission opportunity (e.g., the second transmission opportunity 220).

In a second example, the base station 205 may not receive and/or decode the first connection request. The UE 210 may transmit a second connection request during a third transmission opportunity 225. The second connection request may include a preamble corresponding to the second position. The base station 205 may receive and decode the second connection request. The base station 205 may set the base station connection response window 235 based at least in part on the indication of the position in the transmission sequence. For example, the base station 205 may determine that the preamble sequence in the first connection request indicates a second position. The base station 205 may determine the first position based on the indication. For example, the base station 205 may determine that the first position corresponds to the second transmission opportunity 220 based at least in part on determining that the preamble sequence in the second connection request indicates that the second position corresponds to the third transmission opportunity 225.

Figure 3:
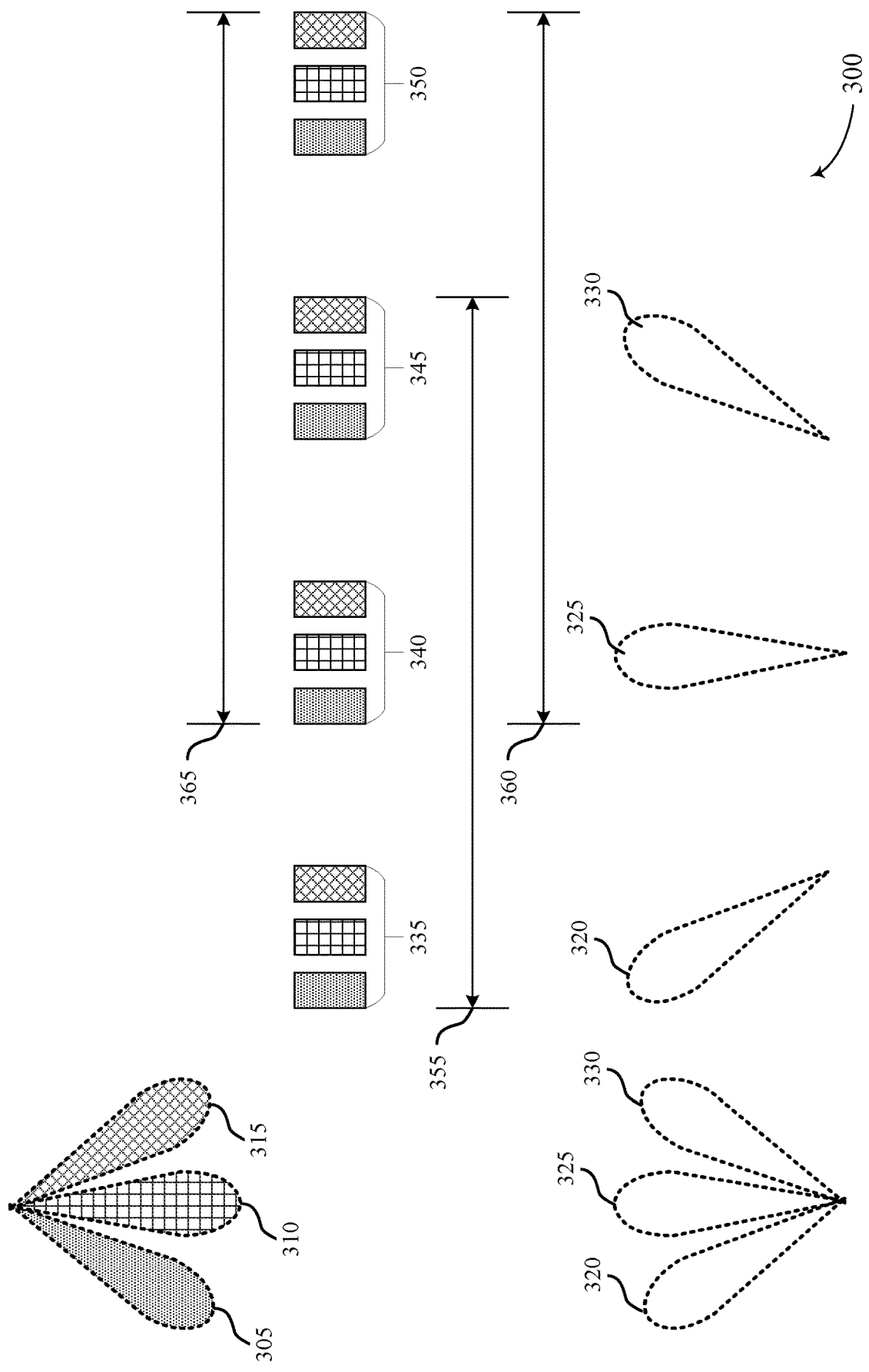
FIG. 3 illustrates an example of a signal exchange in a wireless communications system that supports RAR window ambiguity for multiple message1 transmissions in accordance with aspects of the present disclosure.

FIG. 3 illustrates an example of a signal exchange 300 in a wireless communications system that supports RAR window ambiguity for multiple message1 transmissions in accordance with various aspects of the present disclosure. In some examples, the signal exchange 300 may implement aspects of wireless communication system 100.

The signal exchange 300 shows communications between a base station and a UE, which may be examples of aspects of base station 105 and UE 115, respectively, as described with reference to FIG. 1. The base station may be capable of receiving on a plurality of reception beams (e.g., a first reception beam 305, a second reception beam 310, and a third reception beam 315). The UE may be capable of transmitting on a plurality of transmission beams (e.g., a first transmission beam 320, a second transmission beam 325, and a third transmission beam 330). In some examples, the base station may be capable of receiving on a single reception beam and/or the UE may be capable of transmitting on a single transmission beam.

The signal exchange 300 may include a plurality of transmission opportunities (e.g., a first transmission opportunity 335, a second transmission opportunity 340, a third transmission opportunity 345, and a fourth transmission opportunity 350). The transmission opportunities may be random access transmission opportunities. During each of the transmission opportunities, the UE may transmit using a single beam. In some examples, the UE may use a different beam in consecutive transmission opportunities. In other examples, the UE may use the same beam in consecutive transmission opportunities. The base station may use two or more beams during each transmission opportunity. For example, the base station may cycle through each of the plurality of reception beams during each transmission opportunity. In some other examples, where the base station may be capable of receiving on a single reception beam, the base station may use a single transmission beam during each transmission opportunity.

The UE may reset a UE RAR window after each transmission of a MSG1. For example, the UE may transmit a first MSG1 using the first transmission beam 320 during the first transmission opportunity 335. The UE may set the UE RAR window 355 during the first transmission opportunity 335 (e.g., by setting a UE RAR window counter). In some examples, the counter may correspond to a time period, such that a retransmission may not occur until the period of time has passed. The time period may be configured via a MIB, an RMSIO, an OSI, a DCI, other system information, an RRC message, a handover message, or a combination thereof. In some examples, the counter may correspond to a number of available resources (e.g., CFRA resources), which that a retransmission may not occur until the number of resources has passed (which may be a variable time, depending on when resources are available).

The base station may not receive the first MSG1. Accordingly, the base station may not transmit a MSG2 in response. The base station may also not set a base station RAR window based on the first MSG1. The UE may transmit a second MSG1 using the second transmission beam 325 during the second transmission opportunity 340. The UE may reset the UE RAR window 360 during the second transmission opportunity 340 (e.g., by re-setting the UE RAR window counter). The base station may receive and decode the second MSG1. The base station may set a base station RAR window 365 (e.g., by setting a base station RAR window counter, based on decoding the second MSG1). Because the UE re-set the UE RAR window 360, the UE RAR window 360 corresponds to the base station RAR window 365.

The base station may transmit a first MSG2 responsive to the second MSG1 and prior to the expiration of the base station RAR window 365. Because the base station RAR window 365 corresponds to the UE RAR window 360, the UE may not miss the first MSG2 due to expiration of the UE RAR window 360. The first MSG2 may indicate resources (e.g., time and frequency resources) that the UE may use for a data transmission (e.g., an uplink transmission). The UE may then transmit using the resources indicated in the first MSG2. In some examples, the UE may transmit a RRC connection request using the resources indicated in the first MSG2.

The UE may continue re-setting the UE RAR window upon each transmission of a MSG1 and prior to receipt of a MSG2. For example, the base station may not transmit the MSG2 responsive to the second MSG1 until after the third transmission opportunity 345. The UE may transmit a third MSG1 using the third transmission beam 330 during the third transmission opportunity 345. The UE may reset the UE RAR window upon transmitting the third MSG1. The base station may receive and decode the third MSG1 during the third transmission opportunity 345. The base station may transmit the MSG2 responsive to the second MSG1 after the third transmission opportunity. In some examples, the base station may refrain from transmitting a response to the third MSG1.

Figure 4:
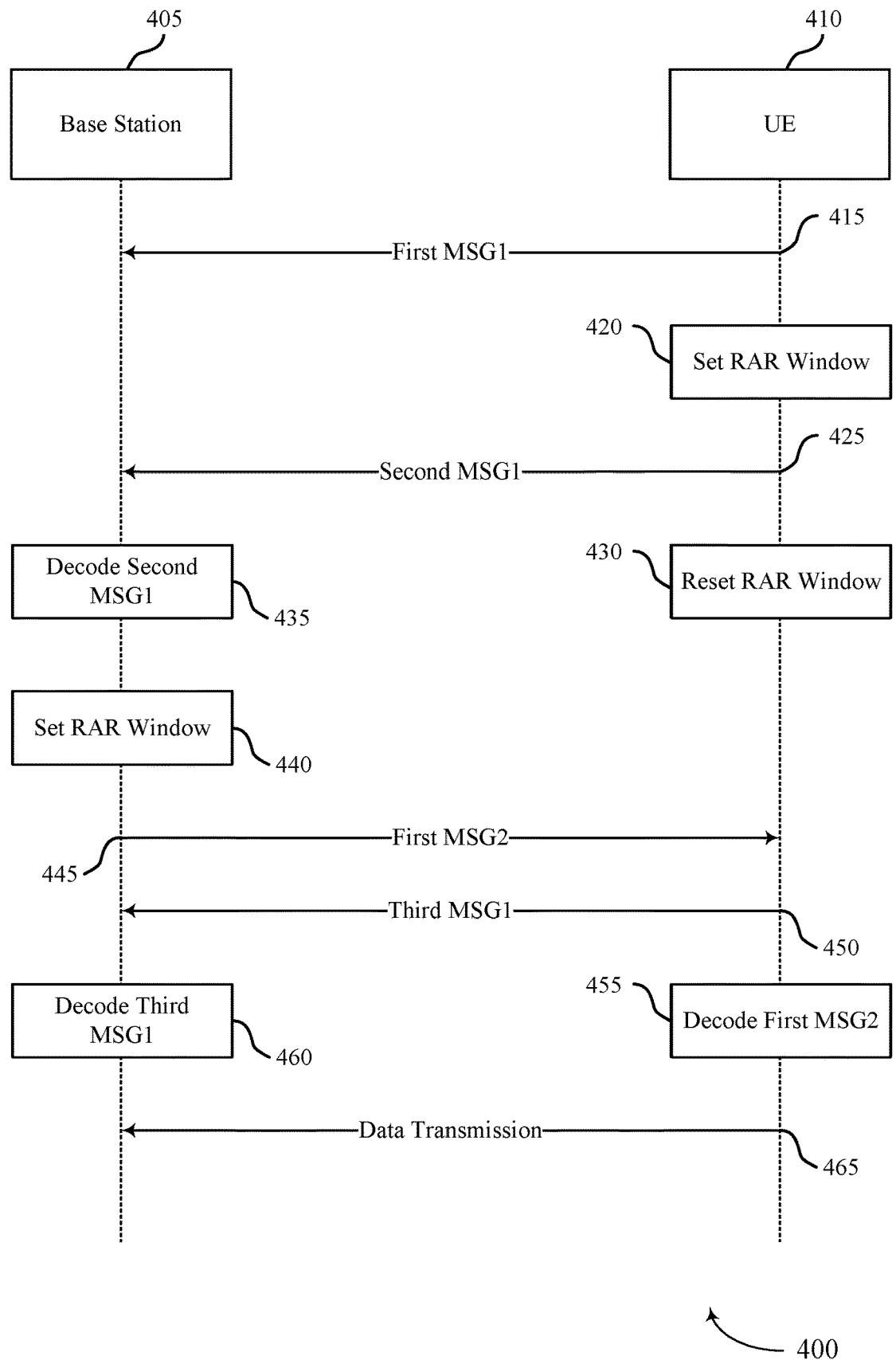
FIGS. 4 and 5 illustrate examples of a communication flow in a wireless communications system that supports RAR window ambiguity for multiple message1 transmissions in accordance with aspects of the present disclosure.

FIG. 4 illustrates an example of a communications flow 400 in a wireless communications system that supports RAR window ambiguity for multiple message1 transmissions in accordance with various aspects of the present disclosure. In some examples, the communications flow 400 may implement aspects of wireless communication system 100. The communications flow 400 may show communications between a base station 405 and a UE 410. The base station 405 may be an example of aspects of base station 105 as described with reference to FIG. 1. The UE 410 may be an example of aspects of UE 115 as described with reference to FIG. 1.

At 415, the UE 410 may transmit a first MSG1 to the base station 405. The UE 410 may transmit the first MSG1 on a first transmission beam during a first transmission opportunity. At 420, the UE 410 may set a UE RAR window. In some examples, setting the UE RAR window may include initializing a UE RAR window counter. The base station 405 may not receive or decode the first MSG1. At 425, the UE 410 may transmit a second MSG1 to the base station 405. The UE 410 may transmit the second MSG1 on a second transmission beam during a second transmission opportunity. At 430, the UE 410 may reset the UE RAR window. In some examples, re-setting the UE RAR window may include re-setting the UE RAR window counter.

At 435, the base station 405 may receive and decode the second MSG1. At 440, the base station 405 may set a base station RAR window. In some examples, setting the base station RAR window may include initializing a base station RAR window counter.

At 445, the base station 405 may transmit a first MSG2 in response to the second MSG1. The base station 405 may transmit the first MSG2 prior to the expiration of the set base station RAR window. The first MSG2 may include an indication of resources (e.g., time and frequency resources) that the UE 410 may use for data transmission (e.g., an uplink transmission).

At 450, the UE 410 may transmit a third MSG1 to the base station 405. At 455, the UE 410 may decode the first MSG2 445. In some examples, the UE 410 may not decode the first MSG2 until after the UE 410 transmits the third MSG1. In some examples, the UE 410 may transmit the third MSG1 using a third transmission beam during a third transmission opportunity. However, complications may arise unless both the UE 410 and the base station 405 have the same understanding as to whether the base station 405 will transmit another MSG2 and/or whether the UE 410 will transmit a MSG3 using the resources identified in the first MSG2 or a subsequent MSG2. For example, the UE 410 may transmit a MSG3 using resources identified in the first MSG2, but the base station 405 may be expecting to receive the MSG3 on resources identified in the subsequent MSG2.

At 460, the base station 405 may decode the third MSG1. The base station 405 may determine not to transmit a second MSG2 responsive to the third MSG1. In some examples, the base station 405 may determine not to transmit the second MSG2 based at least in part on a time difference between the transmission of the first MSG2 and the receipt of the third MSG1. The UE 410 may determine not to wait for the second MSG2. In some examples, the UE 415 may determine not to wait for the second MSG2 based in part on determining that the first MSG2 was received prior to the transmission of the third MSG1. At 465, the UE 415 may send a data transmission based in part on the first MSG2 (e.g., using the resources indicated in the first MSG2). In some examples, the data transmission may include a RRC connection request.

Figure 5:
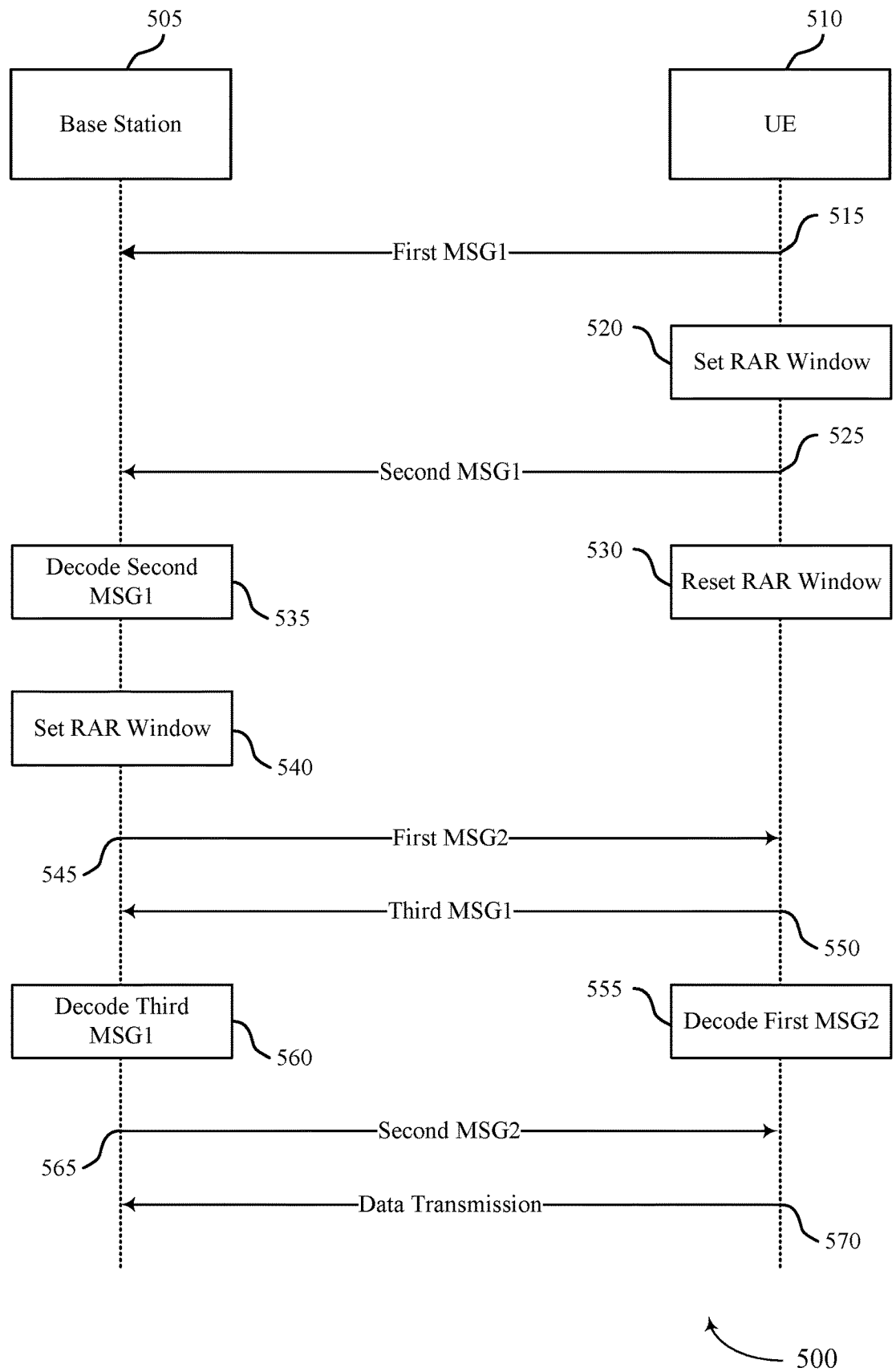

FIG. 5 illustrates an example of a communication flow 500 in a wireless communications system that supports RAR window ambiguity for multiple message1 transmissions in accordance with various aspects of the present disclosure. In some examples, the communication flow 500 may implement aspects of wireless communication system 100. The communication flow 500 may show communications between a base station 505 and a UE 510. The base station 505 may be an example of aspects of base station 105 as described with reference to FIG. 1. The UE 510 may be an example of aspects of UE 115 as described with reference to FIG. 1.

At 515, the UE 510 may transmit a first MSG1 to the base station 505. For example, the UE 510 may transmit the first MSG1 on a first transmission beam during a first transmission opportunity. At 520, the UE 510 may set a UE RAR window. In some examples, setting the UE RAR window may include initializing a UE RAR window counter. Here, the base station 505 may not receive or decode the first MSG1. At 525, the UE 510 may transmit a second MSG1 to the base station 505. For example, the UE 510 may transmit the second MSG1 on a second transmission beam during a second transmission opportunity. At 530, the UE 510 may reset the UE RAR window. In some examples, re-setting the UE RAR window may include re-setting the UE RAR window counter.

At 535, the base station 505 may receive and decode the second MSG1. At 540, the base station 505 may set a base station RAR window. In some examples, setting the base station RAR window may include initializing a base station RAR window counter. At 545, the base station 505 may transmit a first MSG2 in response to the second MSG1. The base station 505 may transmit the first MSG2 prior to the expiration of the set base station RAR window. The first MSG2 may include an indication of resources (e.g., time and frequency resources) that the UE 510 may use for data transmission (e.g., an uplink transmission).

At 555, the UE 510 may decode the first MSG2 545. At 550, the UE may transmit a third MSG1 to the base station 505. In some examples, the UE 510 may not decode the first MSG2 until after the UE 510 transmits a third MSG1. The UE 510 may transmit the third MSG1 using a third transmission beam during a third transmission opportunity. However, complications may arise unless both the UE 510 and the base station 505 have the same understanding as to whether the base station 505 will transmit another MSG2 and/or whether the UE 510 will transmit a MSG3 using the resources identified in the first MSG2 or a subsequent MSG2. For example, the UE 510 may transmit a MSG3 using resources identified in the first MSG2, but the base station 505 may be expecting to receive the MSG3 on resources identified in the subsequent MSG2.

At 560, the base station 505 may decode the third MSG1. At 565, the base station 505 may transmit a second MSG2 responsive to the third MSG1. In some examples, the base station 505 may determine to transmit the second MSG2 responsive to the third MSG1 based in part on receiving the third MSG1 after transmitting the first MSG2. The base station 505 may then transmit the second MSG2. The UE 510 may determine to wait for the second MSG2. In some examples, the base station 505 may not transmit data using the resources indicated in the first MSG2. The UE 510 may receive and decode the second MSG2. At 570, the UE 510 may send a data transmission based in part on the second MSG2 (e.g., using the resources indicated in the second MSG2). In some examples, the data transmission may include an RRC connection request.

Figure 6:
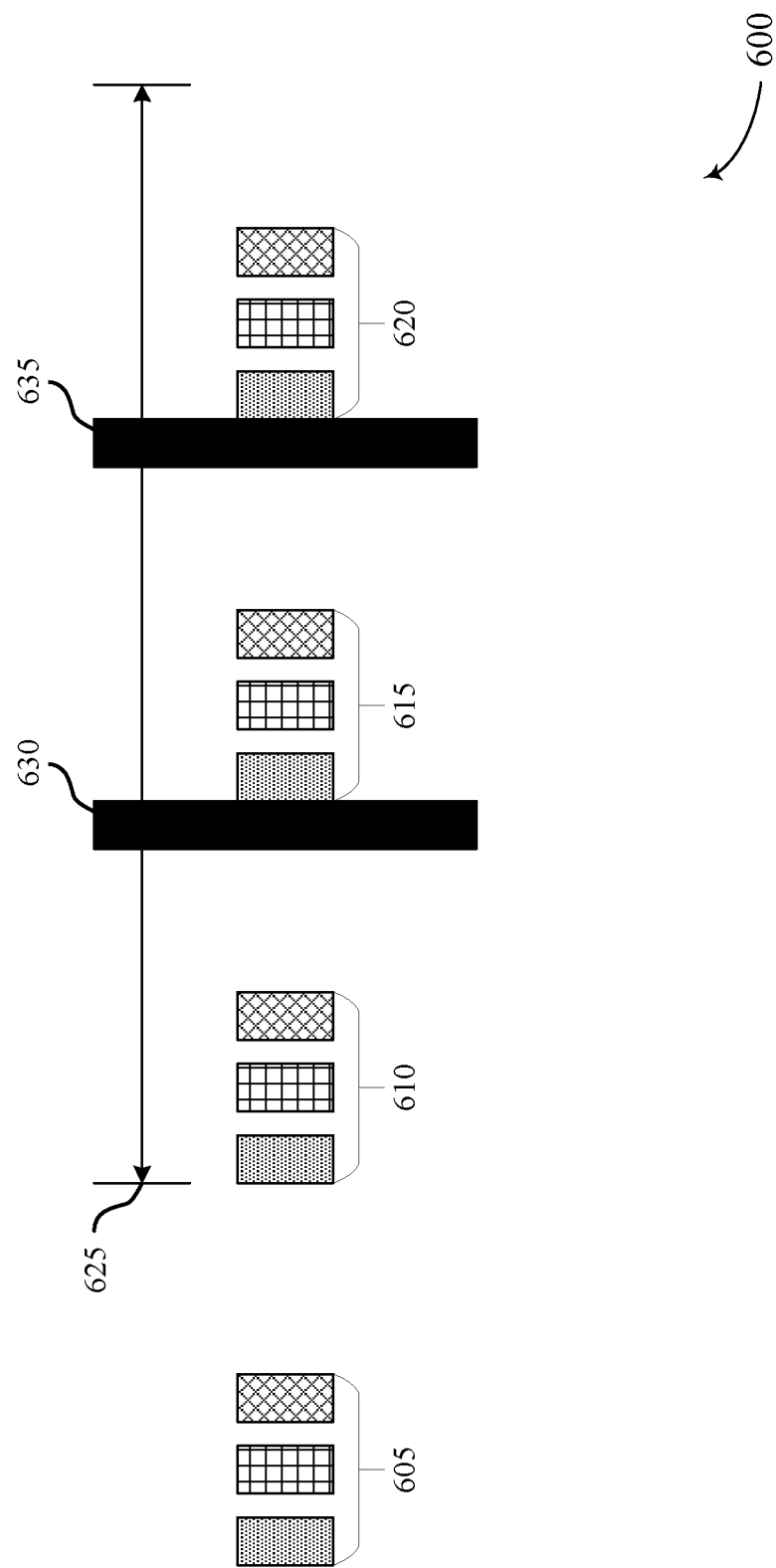
FIGS. 6 through 9 illustrate examples of a signal exchange in a wireless communications system that supports RAR window ambiguity for multiple message1 transmissions in accordance with aspects of the present disclosure.

FIG. 6 illustrates an example of a signal exchange 600 in a wireless communications system that supports RAR window ambiguity for multiple message1 transmissions in accordance with various aspects of the present disclosure. In some examples, the signal exchange 600 may implement aspects of wireless communication system 100.

The signal exchange 600 shows communications between a base station and a UE, which may be examples of aspects of base station 105 and UE 115, respectively, as described with reference to FIG. 1. The signal exchange 600 may include a plurality of transmission opportunities (e.g., a first transmission opportunity 605, a second transmission opportunity 610, a third transmission opportunity 615, and a fourth transmission opportunity 620). The transmission opportunities may be random access transmission opportunities. During each of the transmission opportunities, the UE may transmit using a single beam. In some examples, the UE may use a different beam in consecutive transmission opportunities. In some other examples, the UE may use the same beam in consecutive transmission opportunities. The base station may use two or more beams during each transmission opportunity. For example, the base station may cycle through each of the plurality of reception beams during each transmission opportunity. In some other examples, where the base station may be capable of receiving on a single reception beam, the base station may use a single transmission beam during each transmission opportunity.

The UE may re-set the UE RAR window upon transmission of each MSG1, as described with reference to FIG. 1. For example, the UE may transmit a first MSG1 during the first transmission opportunity 605, and may initialize the UE RAR window upon transmission of the first MSG1. The base station may not receive or decode the first MSG1. The UE may transmit a second MSG1 during the second transmission opportunity 610, and may re-set the UE RAR window upon transmission of the second MSG1 (e.g., by re-setting a UE RAR window counter). The base station may receive and decode the second MSG1, initialize a base station RAR window 625, and prepare a responsive first MSG2. The base station may transmit the first MSG2 prior to the expiration of the base station RAR window 625.

In some examples, the base station may transmit the first MSG2 to the UE prior to the third transmission opportunity 615. However, the UE may not decode the first MSG2 until after the third transmission opportunity 615. In order to mitigate the likelihood of such a situation, the base station may implement a first exclusion period 630 prior to the third transmission opportunity. In some examples, the UE may be configured to refrain from transmitting the first MSG2 during the first exclusion period 630. The length of the first exclusion period 630 may be determined based in part on the amount of time required for decoding the first MSG2. For example, the length of the first exclusion period 630 may be greater than or equal to the amount of time required for decoding the first MSG2.

The MSG2 may be transmitted prior to the first exclusion period 630. In some examples, the MSG2 may also be transmitted after the third transmission opportunity 615. However, the base station may implement additional exclusion periods prior to each transmission opportunity during the base station RAR window 625. For example, the base station may refrain from transmitting a MSG2 such as the first MSG2 during a second exclusion period 635 prior to the fourth transmission opportunity 620. In some examples, the base station may receive and decode a third MSG1 during the third transmission opportunity 615. The base station may determine whether to transmit the first MSG2 or to generate a second MSG2 responsive to the third MSG1. In some examples, the base station may transmit the first MSG2 even when a subsequent MSG1 is received.

Figure 7:
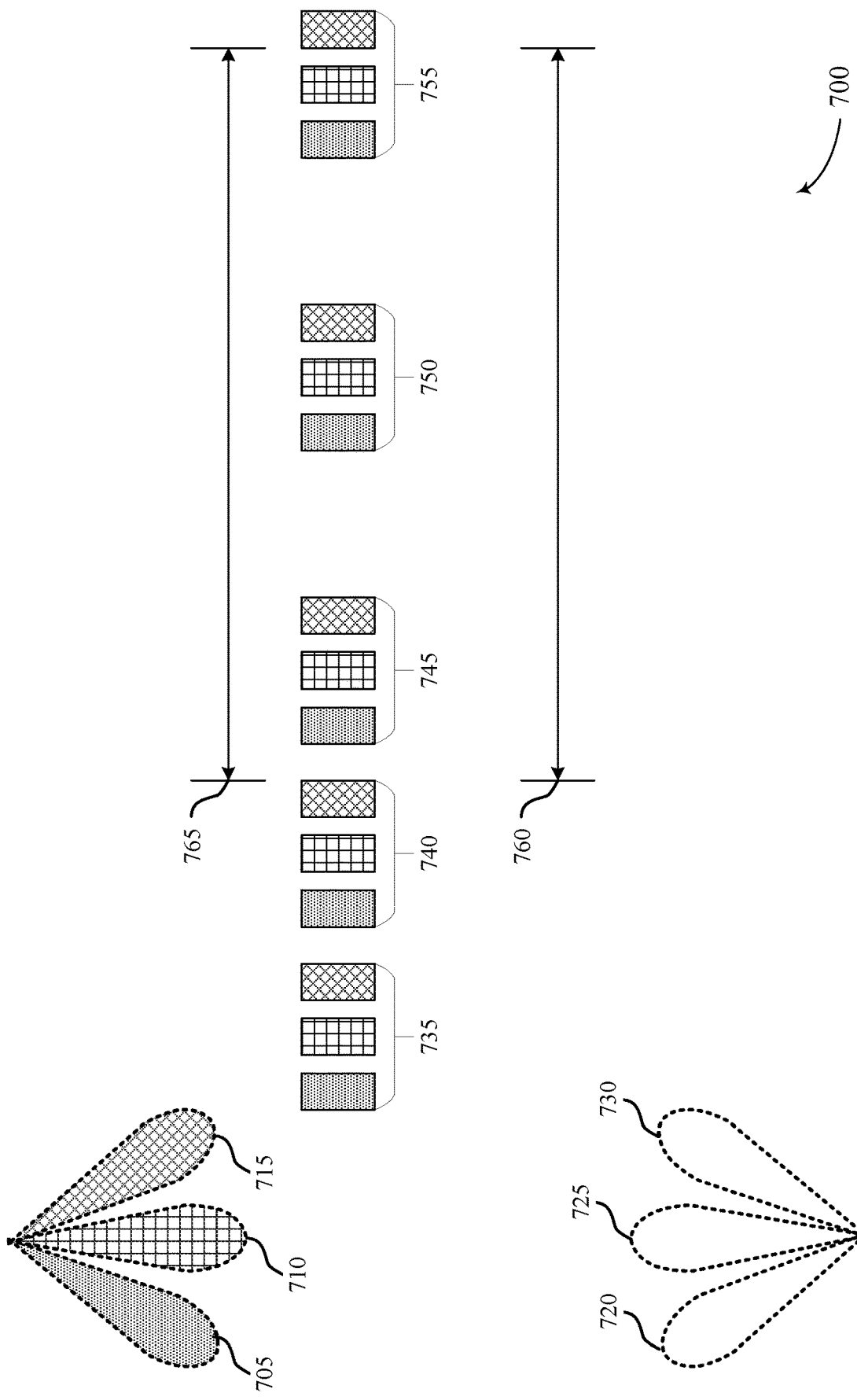

FIG. 7 illustrates an example of a signal exchange 700 in a wireless communications system that supports RAR window ambiguity for multiple message1 transmissions in accordance with various aspects of the present disclosure. In some examples, the signal exchange 700 may implement aspects of wireless communication system 100.

The signal exchange 700 shows communications between a base station and a UE, which may be examples of aspects of base station 105 and UE 115, respectively, as described with reference to FIG. 1. The base station may be capable of receiving on a plurality of reception beams (e.g., a first reception beam 705, a second reception beam 710, and a third reception beam 715). The UE may be capable of transmitting on a plurality of transmission beams (e.g., a first transmission beam 720, a second transmission beam 725, and a third transmission beam 730). In some examples, the base station may be capable of receiving on a single reception beam and/or the UE may be capable of transmitting on a single transmission beam.

The signal exchange 700 may include a plurality of transmission opportunities (e.g., a first transmission opportunity 735, a second transmission opportunity 740, a third transmission opportunity 745, a fourth transmission opportunity 750, and a fifth transmission opportunity 755). The transmission opportunities may be random access transmission opportunities. During each of the transmission opportunities, the UE may transmit using a single beam. In some examples, the UE may use a different beam in consecutive transmission opportunities. In other examples, the UE may use the same beam in consecutive transmission opportunities. The base station may use two or more beams during each transmission opportunity. For example, the base station may cycle through each of the plurality of reception beams during each transmission opportunity. In some other examples, where the base station may be capable of receiving on a single reception beam, the base station may use a single transmission beam during each transmission opportunity.

The UE may be configured to transmit multiple MSG1s in consecutive transmission opportunities. The base station and the UE may set their respective RAR windows based in part on the last of the consecutive transmission opportunities. The UE may identify two or more consecutive transmission opportunities for transmitting MSG1s. In some examples, the base station may indicate the consecutive transmission opportunities (e.g., RACH occasions) which may be used for transmission of multiple MSG1s. In some examples, multiple MSG1s may be transmitted in dedicated time domain RACH resources of a slot. In some examples, the multiple MSG1s may be transmitted in common RACH resources. One SSB may be mapped to four RACH occasions that are located consecutively in the time domain.

The UE may transmit multiple MSG1s during the two or more consecutive transmission opportunities. The base station may refrain from transmitting a MSG2 responsive to the MSG1s until after the two or more consecutive transmission opportunities. The UE may initialize a UE RAR window 760 based in part on the two or more consecutive transmission opportunities. For example, the UE may initialize the UE RAR window 760 based in part on a last transmission opportunity of the two or more consecutive transmission opportunities. In some examples, the UE may initialize the UE RAR window 760 by initializing a UE RAR window counter at the end of a last preamble of the two or more consecutive transmission opportunities.

The base station may likewise initialize the base station RAR window 765 based at least in part on the two or more consecutive transmission opportunities. For example, the base station may initialize the base station RAR window 765 based in part on the last transmission opportunity of the two or more consecutive transmission opportunities. In some examples, the base station may initialize the base station RAR window 765 by initializing a base station RAR window counter at the end of a last preamble of the two or more consecutive transmission opportunities. The base station may then transmit a MSG2 responsive to the a MSG1 transmitted during the two or more consecutive transmission opportunities. The base station may transmit the MSG2 prior to the expiration of the base station RAR window 765. The MSG2 may identify resources (e.g., time and frequency resources) that the UE may use for one or more data transmissions (e.g., uplink transmissions). The UE may send a data transmission based in part on the MSG2 (e.g., using the resources indicated in the MSG2). In some examples, the data transmission may include a RRC connection request.

In some examples, the base station may non-coherently combine preambles transmitted during the two or more consecutive transmission opportunities. In some examples, the UE may transmit in a sub-set of the allocated RACH resources. In some examples, the UE may select the size of the consecutive sub-set of allocated RACH resources. The UE may terminate transmission of the multiple MSG1s upon determining that the base station has likely received at least one of the MSG1s. In some other examples, the base station may transmit an indication of the size of the consecutive sub-set of allocated RACH resources to the UE.

Figure 8:
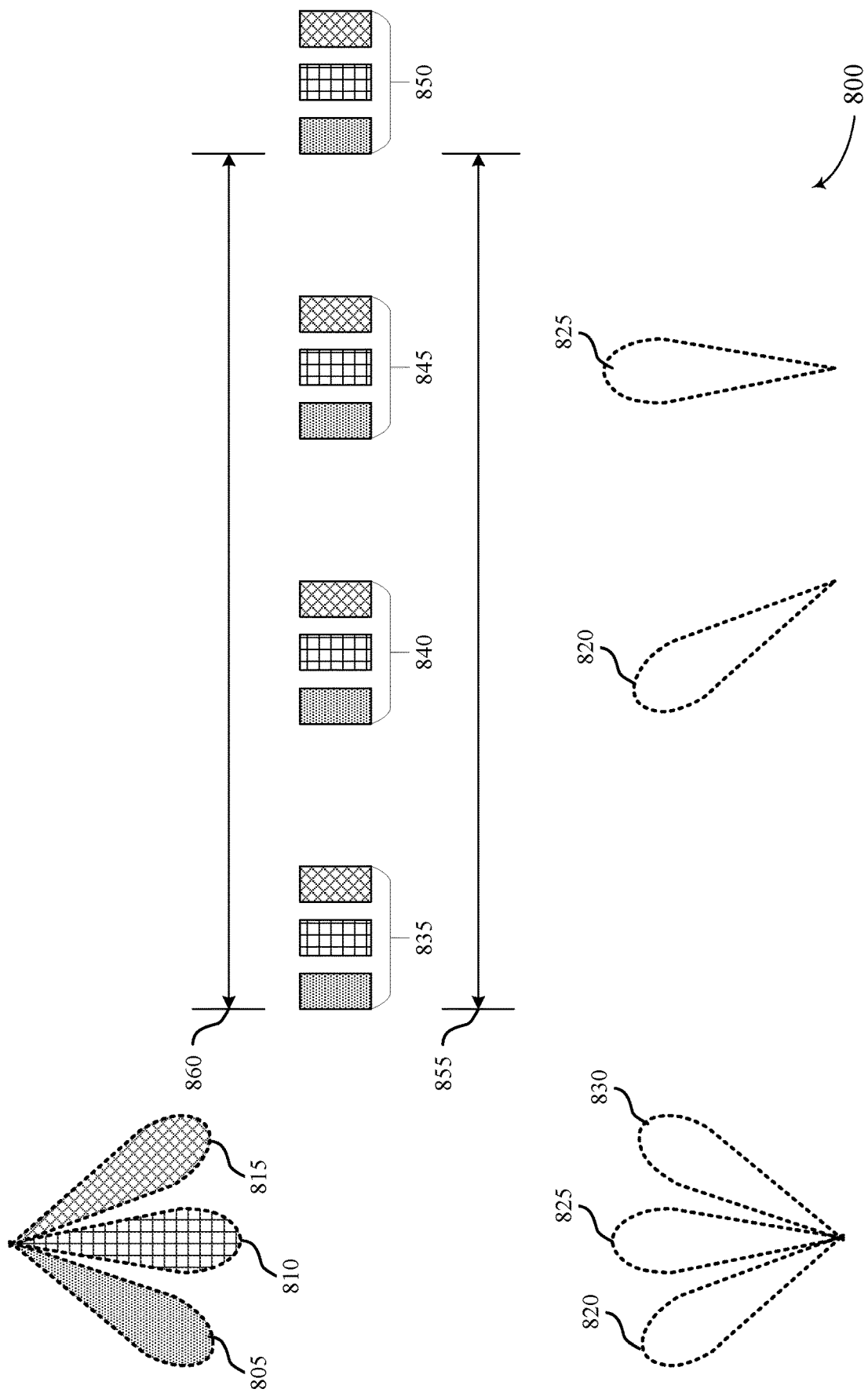

FIG. 8 illustrates an example of a signal exchange 800 in a wireless communications system that supports RAR window ambiguity for multiple message1 transmissions in accordance with various aspects of the present disclosure. In some examples, the signal exchange 800 may implement aspects of wireless communication system 100.

The signal exchange 800 shows communications between a base station and a UE, which may be examples of aspects of base station 105 and UE 115, respectively, as described with reference to FIG. 1. The base station may be capable of receiving on a plurality of reception beams (e.g., a first reception beam 805, a second reception beam 810, and a third reception beam 815). The UE may be capable of transmitting on a plurality of transmission beams (e.g., a first transmission beam 820, a second transmission beam 825, and a third transmission beam 830). In some examples, the base station may be capable of receiving on a single reception beam and/or the UE may be capable of transmitting on a single transmission beam.

The signal exchange 800 may include a plurality of transmission opportunities (e.g., a first transmission opportunity 835, a second transmission opportunity 840, a third transmission opportunity 845, and a fourth transmission opportunity 850). The transmission opportunities may be random access transmission opportunities. During each of the transmission opportunities, the UE may transmit using a single beam. In some examples, the UE may use a different beam in consecutive transmission opportunities. In other examples, the UE may use the same beam in consecutive transmission opportunities. The base station may use two or more beams during each transmission opportunity. For example, the base station may cycle through each of the plurality of reception beams during each transmission opportunity. In some examples, where the base station may be capable of receiving on a single reception beam, the base station may use a single transmission beam during each transmission opportunity.

The base station and the UE may set their respective RAR windows based in part on the first transmission opportunity. For example, the base station and the UE may identify a first transmission opportunity 835. The first transmission opportunity 835 may be, for example, a first CFRA opportunity. In some examples, the base station may include an indication of the first transmission opportunity 835 in a handover message. In some examples, the CFRA resources may be a fixed set of slots in a frame, sub-frame, or the like, which may be indicated by a PRACH mask.

The base station may initialize a base station RAR window 860 based in part on the first transmission opportunity 835. For example, the base station may initialize a base station RAR window counter at the end of the first transmission opportunity 835. Likewise, the UE may initialize a UE RAR window 855 based in part on the first transmission opportunity 835 (e.g., by initializing the UE RAR window counter at the end of the first transmission opportunity 835). Each of the base station and the UE may set their respective RAR windows without regard to whether the UE transmits a MSG1 during the first transmission opportunity 835.

The UE may subsequently transmit a MSG1 during the RAR window. For example, the UE may transmit a first MSG1 using the first transmission beam 820 during the second transmission opportunity 840, and may transmit a second MSG1 using the second transmission beam 825 during the third transmission opportunity 845. The base station may receive and decode the first MSG1 and/or the second MSG1 transmitted by the UE. The base station may then transmit a MSG2 responsive to one of the first MSG1 or the second MSG1. The base station may transmit the MSG2 prior to the expiration of the base station RAR window. The MSG2 may identify resources (e.g., time and frequency resources) that the UE may use for one or more data transmissions (e.g., uplink transmissions). The UE may send a data transmission based at least in part on the MSG2 (e.g., using the resources indicated in the MSG2). In some examples, the data transmission may include a RRC connection request.

Figure 9:
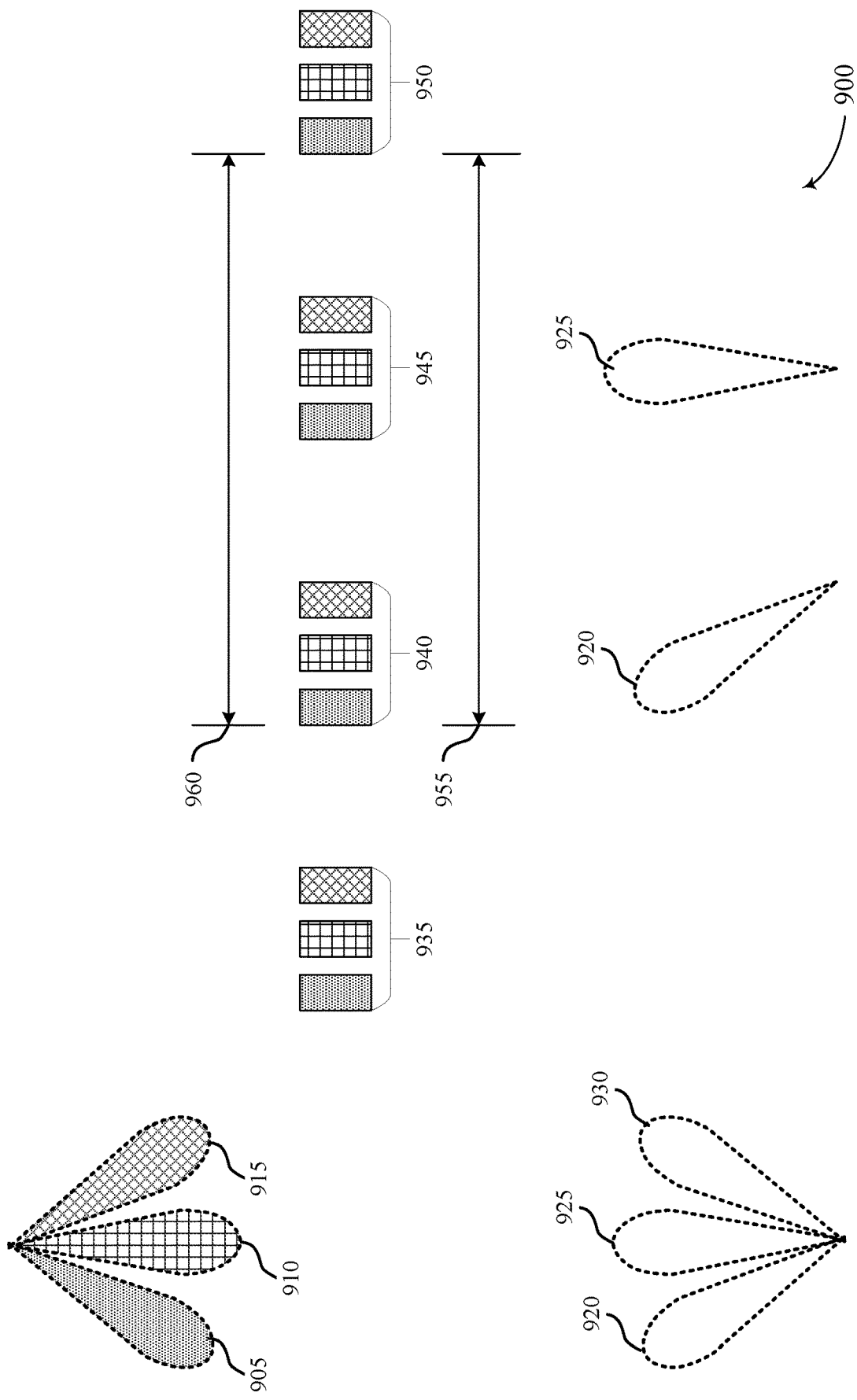

FIG. 9 illustrates an example of a signal exchange 900 in a wireless communications system that supports RAR window ambiguity for multiple message1 transmissions in accordance with various aspects of the present disclosure. In some examples, the signal exchange 900 may implement aspects of wireless communication system 100.

The signal exchange 900 shows communications between a base station and a UE, which may be examples of aspects of base station 105 and UE 115, respectively, as described with reference to FIG. 1. The base station may be capable of receiving on a plurality of reception beams (e.g., a first reception beam 905, a second reception beam 910, and a third reception beam 915). The UE may be capable of transmitting on a plurality of transmission beams (e.g., a first transmission beam 920, a second transmission beam 925, and a third transmission beam 930). In other examples, the base station may be capable of receiving on a single reception beam and/or the UE may be capable of transmitting on a single transmission beam.

The signal exchange 900 may include a plurality of transmission opportunities (e.g., a first transmission opportunity 935, a second transmission opportunity 940, a third transmission opportunity 945, and a fourth transmission opportunity 950). The transmission opportunities may be random access transmission opportunities. During each of the transmission opportunities, the UE may transmit using a single beam. In some examples, the UE may use a different beam in consecutive transmission opportunities. In other examples, the UE may use the same beam in consecutive transmission opportunities. The base station may use two or more beams during each transmission opportunity. For example, the base station may cycle through each of the plurality of reception beams during each transmission opportunity. In some examples, where the base station may be capable of receiving on a single reception beam, the base station may use a single transmission beam during each transmission opportunity.

The UE may include with each MSG1 an indication of a position in a transmission sequence, and the base station may set a base station RAR window based on the indication of a position in a transmission sequence. For example, the UE may determine a set of indications for positions in a transmission sequence. The set of indications may be, for example, a set of preamble sequences, where each preamble sequence corresponds to a different position in the transmission sequence. The base station may configure the UE with the set of indications.

The UE may be configured to transmit only in consecutive transmission opportunities. For example, the UE may refrain from transmitting a MSG1 during a first transmission opportunity 935 (which may be, for example, a first CFRA opportunity). The UE may transmit a first MSG1 using a first transmission beam 920 during a second transmission opportunity 940 (which may be, for example, a second CFRA opportunity). Because the first MSG1 is the first MSG1 in the transmission sequence, the first MSG1 may include an indication of a first position in the transmission sequence. The indication may be a preamble sequence corresponding to the first position. In some examples, the base station may not receive or decode the first MSG1. The UE may initialize a UE RAR window 955 based in part on the transmission of the first MSG1. In some examples, the UE may initialize the UE RAR window 955 by initializing a UE RAR window counter. Because the base station did not receive or decode the first MSG1, the base station may not initialize a base station RAR window during the second transmission opportunity 940.

The UE may transmit a second MSG1 using a second transmission beam 925 during a third transmission opportunity 945 (which may be, for example, a third CFRA opportunity). Because the second MSG1 is the second MSG1 in the transmission sequence, the second MSG1 may include an indication of a second position in the transmission sequence. The indication may be a preamble sequence corresponding to the second position. The base station may receive and decode the second MSG1. The base station may initialize the base station RAR window 960 based in part on the indication of the position in the transmission sequence in the second MSG2. For example, the base station may determine that the second MSG1 is the second MSG1 in the transmission sequence based in part on a preamble sequence of the second MSG1. The base station may identify the location of the first MSG1 in the transmission sequence based at least in part on the determined position of the received MSG1. In some examples, the base station may determine that the first MSG1 was transmitted during a previous transmission opportunity (e.g., the second transmission opportunity 940). In some examples, where the preamble sequence indicates that the current MSG1 is the first MSG1 in the transmission sequence, the base station may determine that the current MSG1 was transmitted during the current transmission opportunity. The base station may then initialize the base station RAR window 960 based in part on the determined position of the first MSG1 in the transmission sequence.

The base station may then transmit a MSG2 responsive to the first MSG1. The base station may transmit the MSG2 prior to the expiration of the base station RAR window. The MSG2 may identify resources (e.g., time and frequency resources) that the UE may use for one or more data transmissions (e.g., uplink transmissions). The UE may send a data transmission based in part on the MSG2 (e.g., using the resources indicated in the MSG2). In some examples, the data transmission may include a RRC connection request. In some examples, the UE may not be configured to transmit in consecutive transmission opportunities. In such examples, the indication of a position in a transmission sequence may take into account available transmission opportunities which were skipped. For example, the UE may transmit a first MSG1 during the first transmission opportunity 935, refrain from transmitting a MSG1 during the second transmission opportunity 940, and transmit a second MSG1 during the third transmission opportunity 945. In such examples, the MSG1 may include an indication of a third position in the transmission sequence (e.g., a preamble sequence corresponding to the third position in the transmission sequence). Accounting for the lack of transmission during the intervening available transmission opportunity (e.g., second transmission opportunity 940) may allow the base station to properly identify the location of the first transmission in the transmission sequence (in this example, the first transmission opportunity 935).

Figure 10:
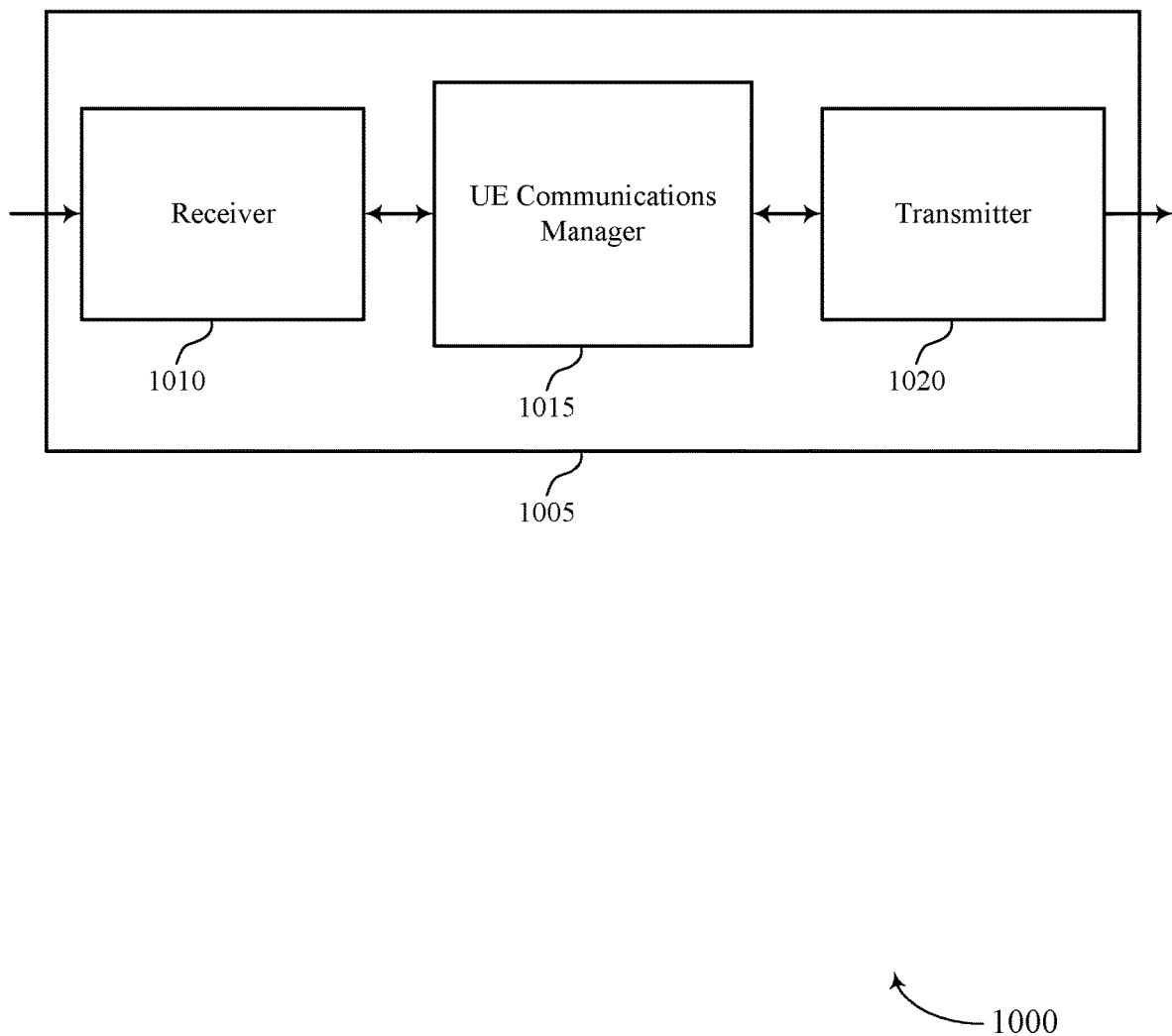
FIGS. 10 through 12 show block diagrams of a device that supports RAR window ambiguity for multiple message1 transmissions in accordance with aspects of the present disclosure.

FIG. 10 shows a block diagram 1000 of a wireless device 1005 that supports RAR window ambiguity for multiple message1 transmissions in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to random access response window ambiguity for multiple message1 transmissions, etc.). Information may be passed on to other components of the device. The receiver 1010 may be an example of aspects of the transceiver 1335 described with reference to FIG. 13. The receiver 1010 may utilize a single antenna or a set of antennas.

The UE communications manager 1015 may be an example of aspects of the UE communications manager 1315 described with reference to FIG. 13. The UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE communications manager 1015 may transmit a first connection request, set a connection response window based on the first connection request, transmit a second connection request prior to an expiration of the connection response window, re-set the connection response window based on the second connection message, receive a connection response prior to an expiration of the reset connection response window, and transmit uplink data based on the connection response. The UE communications manager 1015 may also identify a set of random access transmission opportunities, select a subset of consecutive random access transmission opportunities from the set of random access transmission opportunities, and transmit a connection request in each of the subset of consecutive random access transmission opportunities. The UE communications manager 1015 may also determine a connection response window and transmit two or more connection requests during the connection response window, where each of the two or more connection requests includes an indication of a position in a transmission sequence.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
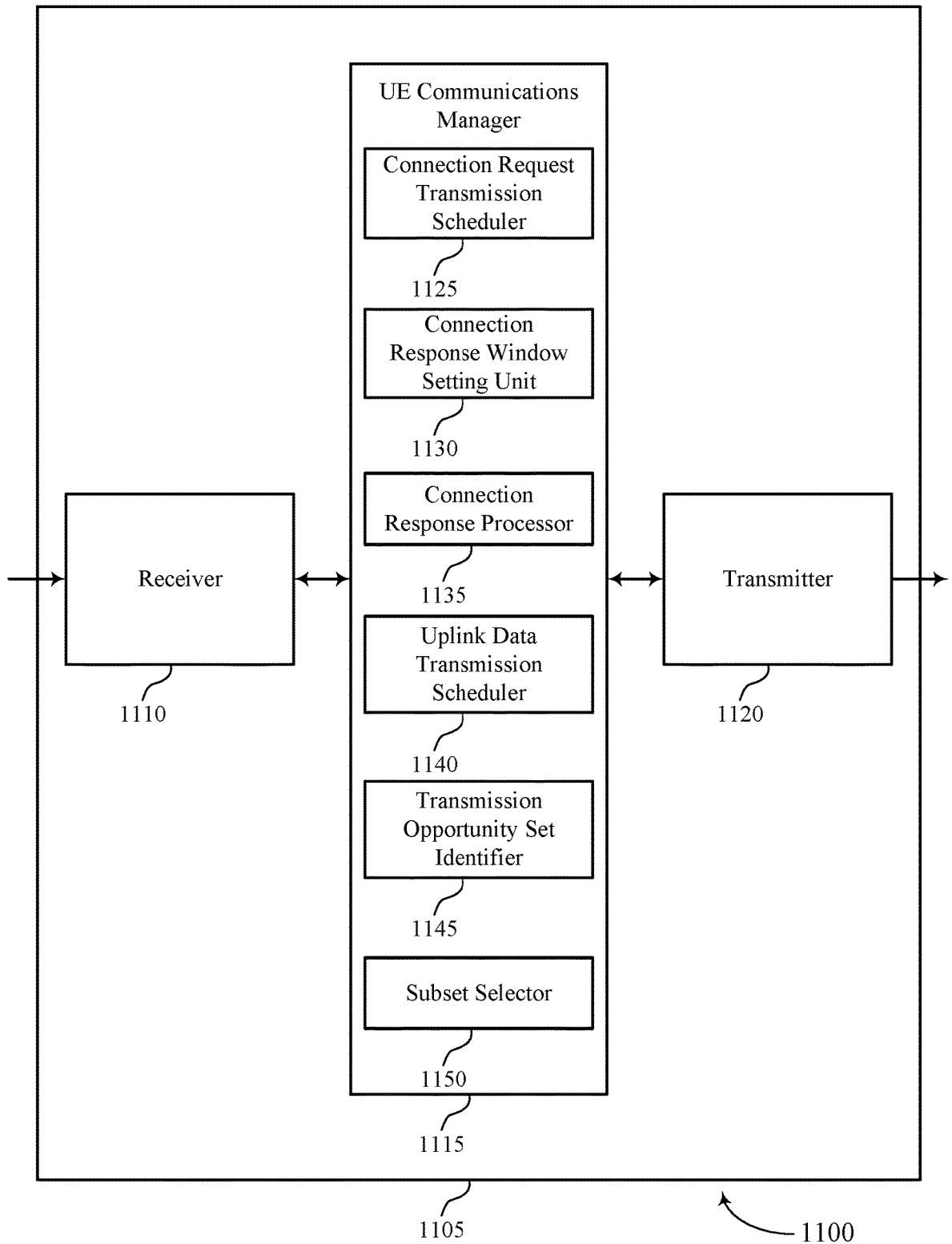

FIG. 11 shows a block diagram 1100 of a wireless device 1105 that supports RAR window ambiguity for multiple message1 transmissions in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to random access response window ambiguity for multiple message1 transmissions, etc.). Information may be passed on to other components of the device. The receiver 1110 may be an example of aspects of the transceiver 1335 described with reference to FIG. 13. The receiver 1110 may utilize a single antenna or a set of antennas.

The UE communications manager 1115 may be an example of aspects of the UE communications manager 1315 described with reference to FIG. 13. The UE communications manager 1115 may also include connection request transmission scheduler 1125, connection response window setting unit 1130, connection response processor 1135, uplink data transmission scheduler 1140, transmission opportunity set identifier 1145, and subset selector 1150.

The connection request transmission scheduler 1125 may transmit a connection request in each of a subset of consecutive random access transmission opportunities, and transmit two or more connection requests during the connection response window. In some examples, each of the two or more connection requests includes an indication of a position in a transmission sequence. Each of the two or more connection requests are transmitted using a different transmission beam. In some cases, the connection request includes a first random access preamble transmission. The connection request transmission scheduler 1125 may transmit a first connection request. In some cases, a first connection request transmitted in a first of the consecutive transmission opportunities is transmitted using a first transmission beam. The connection request transmission scheduler 1125 may transmit a second connection request prior to an expiration of a connection response window. In some cases, a second connection request transmitted in a second of the consecutive transmission opportunities is transmitted using a second transmission beam.

The connection response window setting unit 1130 may set a connection response window based on the first connection request. The connection response window setting unit 1130 may re-set the connection response window each time an additional connection response message is transmitted prior to the expiration of the connection response window. The connection response window setting unit 1130 may set a connection response window based on a last of the consecutive random access transmission opportunities. The connection response window setting unit 1130 may re-set the connection response window based on the second connection message.

The connection response window setting unit 1130 may determine a connection response window, and transmit time period configuration information for a UE connection response window in a MIB, an RMSI, an OSI, a DCI, an RRC message, a handover message, or a combination thereof. In some cases, the connection response window includes a number of available random access resources. In some cases, the connection response window includes a RAR window. In some cases, the connection response window includes a time period. The time period may be configured based on a MIB, an RMSI, an OSI, a DCI, an RRC message, a handover message, or a combination thereof.

The connection response processor 1135 may receive a connection response prior to an expiration of the reset connection response window and receive a second connection response based on the second connection request. In some examples, the uplink data may transmitted based on the second connection response. In some examples, receiving a connection response includes receiving a first connection response in response to the first connection request. In some cases, the connection response includes RAR. In some cases, the connection response identifies resources for a data transmission by the UE. The uplink data transmission scheduler 1140 may transmit uplink data based on the connection response. The transmission opportunity set identifier 1145 may identify a set of random access transmission opportunities. The subset selector 1150 may select a subset of consecutive random access transmission opportunities from the set of random access transmission opportunities.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
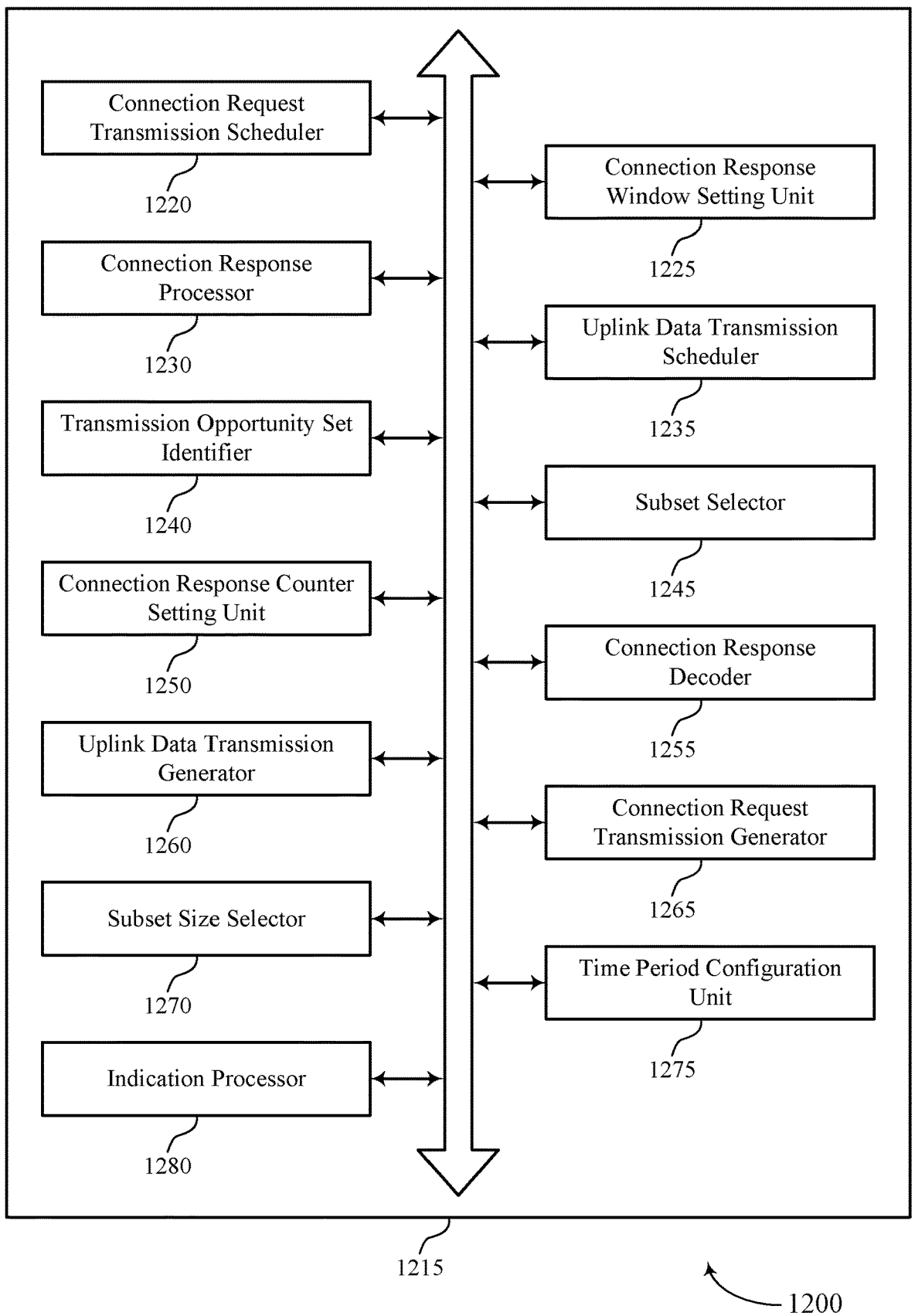

FIG. 12 shows a block diagram 1200 of a UE communications manager 1215 that supports RAR window ambiguity for multiple message1 transmissions in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include connection request transmission scheduler 1220, connection response window setting unit 1225, connection response processor 1230, uplink data transmission scheduler 1235, transmission opportunity set identifier 1240, subset selector 1245, connection response counter setting unit 1250, connection response decoder 1255, uplink data transmission generator 1260, connection request transmission generator 1265, subset size selector 1270, time period configuration unit 1275, and indication processor 1280. Each of these modules may communicate, directly or indirectly, with one another (e.g., via one or more buses).

The connection request transmission scheduler 1220 may transmit a connection request in each of a subset of consecutive random access transmission opportunities, and transmit two or more connection requests during a connection response window. In some examples, each of the two or more connection requests includes an indication of a position in a transmission sequence. Each of the two or more connection requests may be transmitted using a different transmission beam In some examples, the connection request includes a first random access preamble transmission. The connection request transmission scheduler 1220 may transmit a first connection request. The connection request transmission scheduler 1220 may transmit a second connection request prior to an expiration of a connection response window. In some examples, a first connection request transmitted in a first of the consecutive transmission opportunities may be transmitted using a first transmission beam. In some cases, a second connection request transmitted in a second of the consecutive transmission opportunities may be transmitted using a second transmission beam.

The connection response window setting unit 1225 may set a connection response window based on the first connection request. The connection response window setting unit 1225 may re-set the connection response window each time an additional connection response message is transmitted prior to the expiration of the connection response window. The connection response window setting unit 1225 may set a connection response window based on a last of the consecutive random access transmission opportunities. The connection response window setting unit 1225 may re-set the connection response window based on the second connection message. The connection response window setting unit 1225 may determine a connection response window, and transmit a time period configuration information for a UE connection response window in a MIB, an RMSI, an OSI, a DCI, an RRC message, a handover message, or a combination thereof. In some cases, the connection response window includes a number of available random access resources. In some cases, the connection response window includes a RAR window. In some cases, the connection response window includes a time period. In some cases, the time period may be configured based on a MIB, an RMSI, an OSI, a DCI, an RRC message, a handover message, or a combination thereof.

The connection response processor 1230 may receive a connection response prior to an expiration of the reset connection response window and receive a second connection response based on the second connection request, where the uplink data is transmitted based on the second connection response. In some cases, receiving a connection response includes receiving a first connection response in response to the first connection request. In some cases, the connection response includes a RAR. In some cases, the connection response identifies resources for a data transmission by the UE.

The uplink data transmission scheduler 1235 may transmit uplink data based on the connection response. The transmission opportunity set identifier 1240 may identify a set of random access transmission opportunities. The subset selector 1245 may select a subset of consecutive random access transmission opportunities from the set of random access transmission opportunities. The connection response counter setting unit 1250 may re-set the connection response window includes re-setting a connection response counter associated with the connection response window, wherein the counter counts time elapsed after starting the connection response window. The connection response decoder 1255 may decode the first connection response, where the second connection request is transmitted before the first connection response is decoded. The uplink data transmission generator 1260 may generate uplink data for transmission. In some cases, the uplink data is transmitted based on the first connection response. In some cases, the uplink data includes a RRC connection request. In some cases, the uplink data includes a RACH MSG3.

The connection request transmission generator 1265 may generate one or more connections requests for transmission. In some cases, the first connection request includes a first random access preamble transmission. In some cases, the second connection request includes a second random access preamble transmission. In some cases, the first connection request is transmitted using a first transmission beam, and the second connection request is transmitted using a second transmission beam. In some cases, the indication of a transmission sequence includes a preamble sequence corresponding to the position in the transmission sequence. In some cases, each of the two or more connection requests include a random access preamble transmission.

The subset size selector 1270 may select a size of the subset of consecutive random access transmission opportunities and receive, from a base station, an indication of a size of the subset of consecutive random access transmission opportunities. The time period configuration unit 1275 may configure the time period for the connection response window. In some cases, the time period may be configured based on a MIB, an RMSI, an OSI, a DCI, an RRC message, a handover message, or a combination thereof. The indication processor 1280 may receive, from a base station, a set of indications corresponding to different positions in a transmission sequence.

Figure 13:
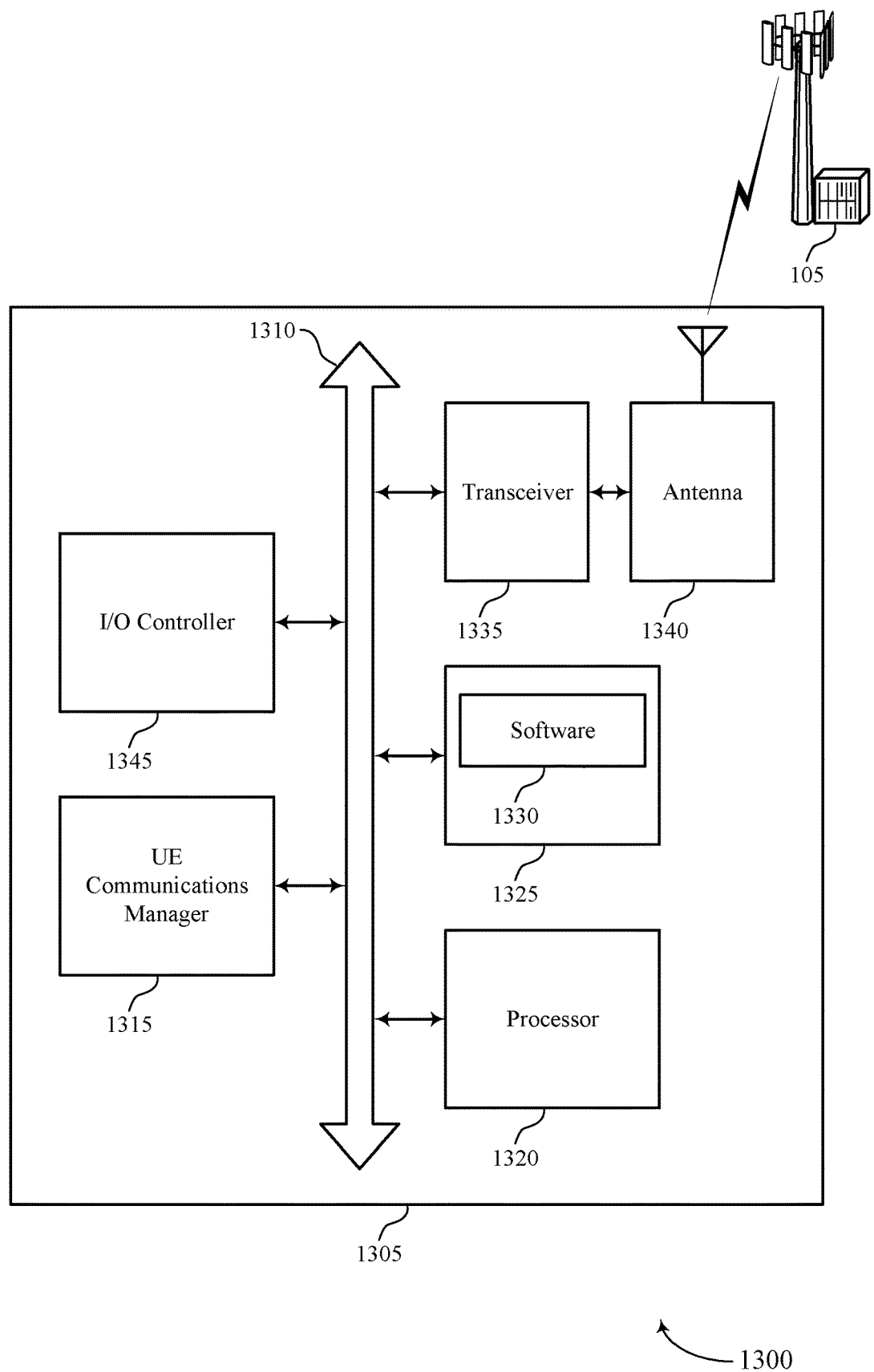
FIG. 13 illustrates a block diagram of a system including a UE that supports RAR window ambiguity for multiple message1 transmissions in accordance with aspects of the present disclosure.

FIG. 13 shows a diagram of a system 1300 including a device 1305 that supports RAR window ambiguity for multiple message1 transmissions in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting random access response window ambiguity for multiple message1 transmissions).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support random access response window ambiguity for multiple message1 transmissions. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the device 1305 may include a single antenna 1340. However, in some cases the device 1305 may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS, ANDROID, MS-DOS, MS-WINDOWS, OS/2, UNIX, LINUX, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
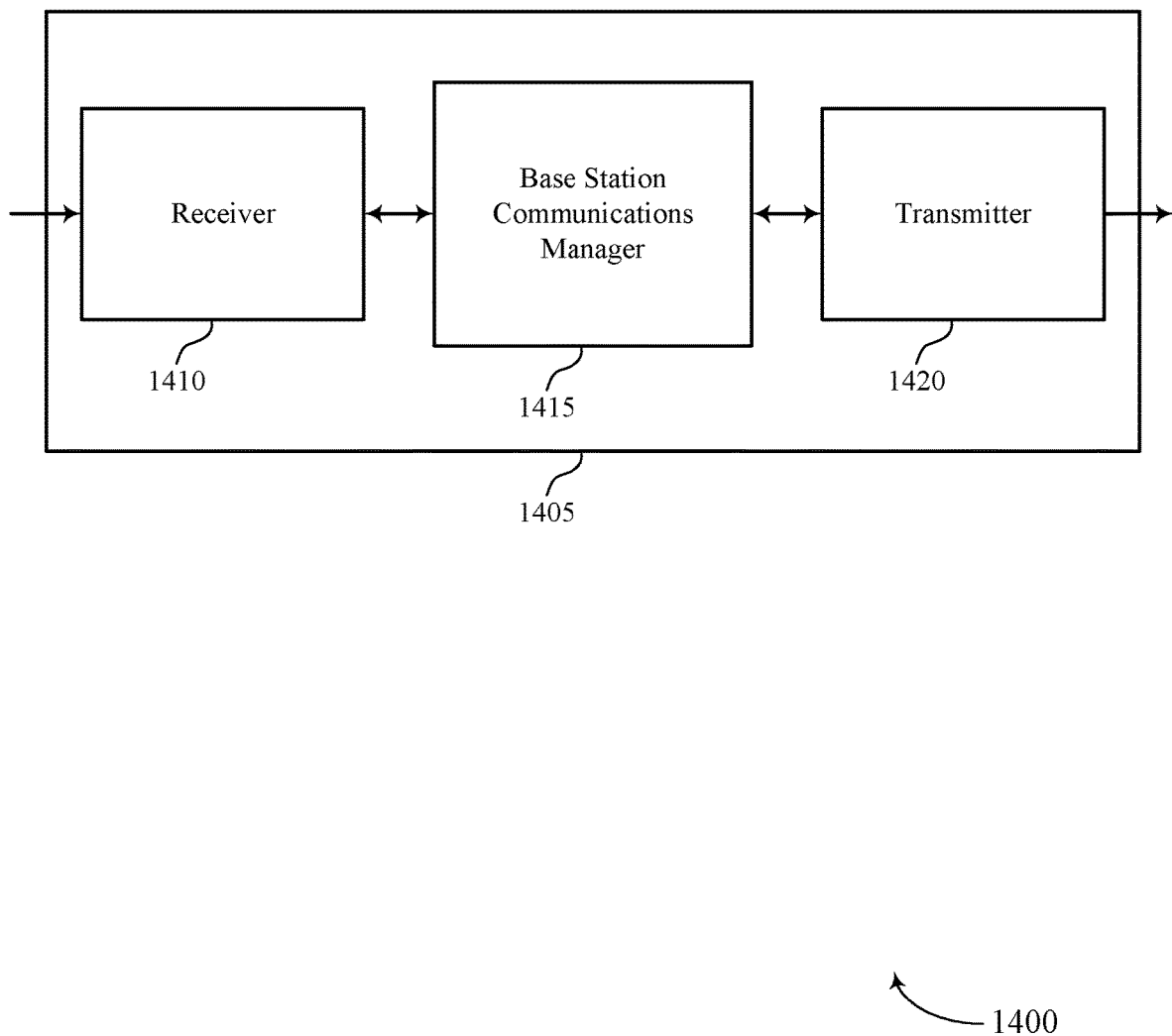
FIGS. 14 through 16 show block diagrams of a device that supports RAR window ambiguity for multiple message1 transmissions in accordance with aspects of the present disclosure.

FIG. 14 shows a block diagram 1400 of a wireless device 1405 that supports RAR window ambiguity for multiple message1 transmissions in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to random access response window ambiguity for multiple message1 transmissions, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17.

Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may receive a first connection request from a UE, transmit a first connection response based on the first connection request, receive a second connection request from the UE after transmitting the first connection response, and refrain from transmitting a second connection response in response to the second connection request. The base station communications manager 1415 may also receive a first connection request from a UE, transmit a first connection response based on the first connection request, receive a second connection request from the UE after transmitting the first connection response, set a connection response window based on the first connection request, and transmit a second connection response in response to the second connection request prior to an expiration of the connection response window. The base station communications manager 1415 may also receive a first connection request from a UE, determine a next random access transmission opportunity for the UE, and refrain from transmitting a first connection response during an exclusion period preceding the next random access transmission opportunity.

The base station communications manager 1415 may also identify a set of random access transmission opportunities associated with a UE, receive at least one connection request from the UE during the set of random access transmission opportunities, set a connection response window based on the at least one connection request, and transmit a connection response prior to an expiration of the connection response window. The base station communications manager 1415 may also identify a first random access transmission opportunity associated with a UE, set a connection response window based on the identified first random access transmission opportunity, receive a connection request from the UE during the connection response window, and transmit a connection response prior to an expiration of the connection response window. The base station communications manager 1415 may also receive a connection request, where the connection request includes an indication of a position in a transmission sequence, determine, based on the indication of the position in the transmission sequence, a connection response window, and transmit a connection response prior to an expiration of the connection response window.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
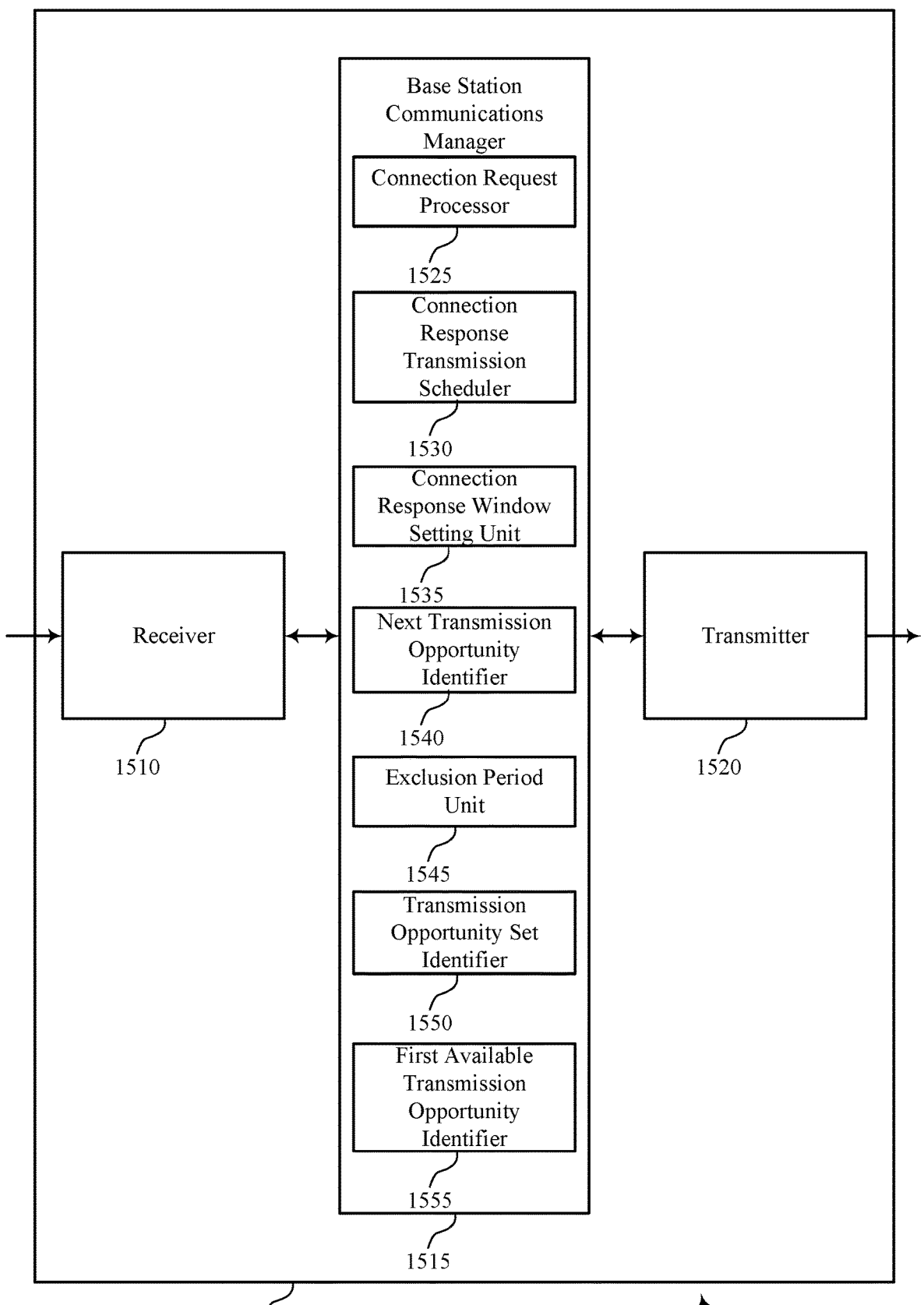

FIG. 15 shows a block diagram 1500 of a wireless device 1505 that supports RAR window ambiguity for multiple message1 transmissions in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to random access response window ambiguity for multiple message1 transmissions, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. The base station communications manager 1515 may also include connection request processor 1525, connection response transmission scheduler 1530, connection response window setting unit 1535, next transmission opportunity identifier 1540, exclusion period unit 1545, transmission opportunity set identifier 1550, and first available transmission opportunity identifier 1555.

The connection request processor 1525 may at least one connection request from a UE during a set of random access transmission opportunities. In some examples, the at least one connection request includes a first random access transmission preamble. For example, the connection request processor 1525 may receive a first connection request from the UE, and the first connection request may include a first random access preamble transmission. The connection request processor 1525 may receive a second connection request from the UE after transmitting the first connection response. In other examples, the connection request processor 1525 may receive a second connection request from the UE during a next random access transmission opportunity. The second connection request may include a second random access preamble transmission. The connection request processor 1525 may receive a connection request from the UE during a connection response window. The connection request includes an indication of a position in a transmission sequence.

The connection response transmission scheduler 1530 may transmit a connection response prior to an expiration of a connection response window. The connection response transmission scheduler 1530 may transmit a first connection response based on the first connection request. In some examples, the connection response transmission scheduler 1530 may refrain from transmitting the first connection response. In some examples, refraining from transmitting the first connection response during the exclusion period may include transmitting the first connection response prior to an exclusion period. The connection response transmission scheduler 1530 may determine to transmit a second connection response or refrain from transmitting the second connection response in response to the second connection request, and transmit a second connection response based on the second connection request and based in part on the determination. In some examples, the connection response transmission scheduler 1530 may determine to transmit a second connection response or refrain from transmitting the second connection response in response to the second connection request, and refrain from transmitting the second connection response in response to the second connection request based in part on the determination. In some examples, the connection response transmission scheduler 1530 may transmit the second connection response in response to the second connection request prior to an expiration of the connection response window.

The connection response window setting unit 1535 may set a connection response window based on the at least one connection request. In some examples, the connection response window setting unit 1535 may set a connection response window based on the first connection request. The connection response window setting unit 1535 may transmit a time period configuration information for the UE connection response window in a MIB, an RMSI, an OSI, a DCI, an RRC message, a handover message, or a combination thereof. The connection response window setting unit 1535 may determine, based on the indication of the position in the transmission sequence, a connection response window, and set a connection response window based on the identified first random access transmission opportunity. In some cases, the connection response window includes a number of available random access resources. In some cases, the connection response window includes a time period. The time period may be configured based on a MIB, an RMSI, an OSI, a DCI, an RRC message, a handover message, or a combination thereof. In some cases, the connection response window includes a number of available random access resources. In some cases, the connection response window includes a RAR window.

The next transmission opportunity identifier 1540 may determine a next random access transmission opportunity for the UE. The exclusion period unit 1545 may refrain from transmitting the first connection response during the exclusion period preceding the next random access transmission opportunity. The transmission opportunity set identifier 1550 may identify a set of random access transmission opportunities associated with the UE. The first available transmission opportunity identifier 1555 may identify the first random access transmission opportunity associated with a UE.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
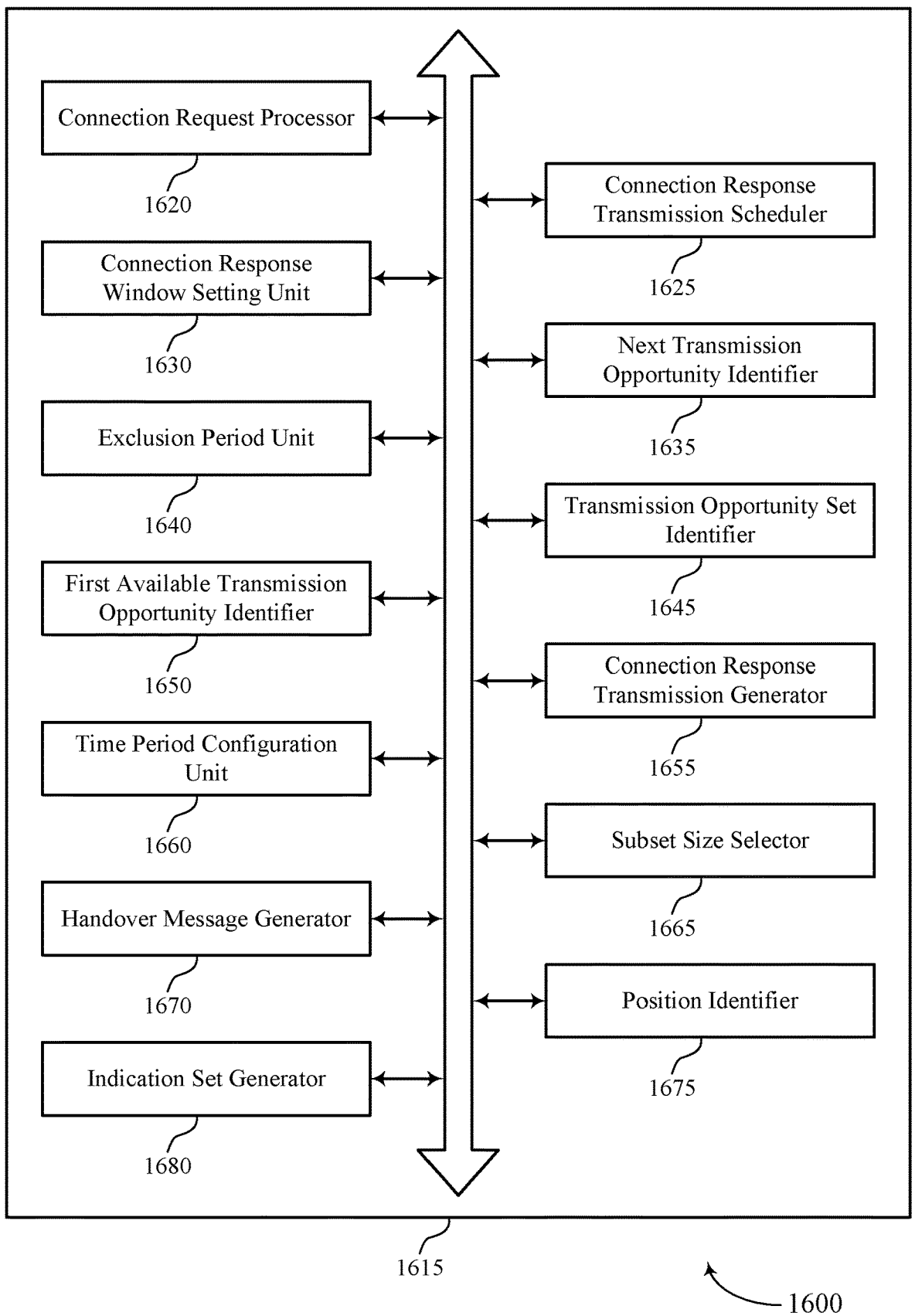

FIG. 16 shows a block diagram 1600 of a base station communications manager 1615 that supports RAR window ambiguity for multiple message1 transmissions in accordance with aspects of the present disclosure. The base station communications manager 1615 may be an example of aspects of a base station communications manager 1715 described with reference to FIGS. 14, 15, and 17. The base station communications manager 1615 may include connection request processor 1620, connection response transmission scheduler 1625, connection response window setting unit 1630, next transmission opportunity identifier 1635, exclusion period unit 1640, transmission opportunity set identifier 1645, first available transmission opportunity identifier 1650, connection response transmission generator 1655, time period configuration unit 1660, subset size selector 1665, handover message generator 1670, position identifier 1675, and indication set generator 1680. Each of these modules may communicate, directly or indirectly, with one another (e.g., via one or more buses).

The connection request processor 1620 may receive at least one connection request from a UE during a set of random access transmission opportunities. In some examples, the at least one connection request includes a first random access transmission preamble. For example, the connection request processor 1620 may receive a first connection request from the UE, and the first connection request may include a first random access preamble transmission. The connection request processor 1620 may, in some examples, receive a second connection request from the UE during a next random access transmission opportunity. In other examples, the connection request processor 1620 may receive a second connection request from the UE after transmitting the first connection response and during a next random access transmission opportunity. The second connection request may include a second random access preamble transmission. The connection request processor 1620 may receive a connection request from the UE during a connection response window. The connection request may include an indication of a position in a transmission sequence.

The connection response transmission scheduler 1625 may transmit a first connection response based on the first connection request. In some examples, the connection response transmission scheduler 1625 may refrain from transmitting the first connection response. In some examples, refraining from transmitting the first connection response during the exclusion period may include transmitting the first connection response prior to the exclusion period. The connection response transmission scheduler 1625 may transmit a second connection response in response to the second connection request prior to an expiration of the connection response window. In some examples, the connection response transmission scheduler 1625 may refrain from transmitting a second connection response in response to the second connection request. The connection response transmission scheduler 1625 may transmit a second connection response based on the second connection request, and transmit a connection response prior to an expiration of the connection response window.

The connection response window setting unit 1630 may set a connection response window based on the at least one connection request. For example, the connection response window setting unit 1630 may set a connection response window based on the first connection request. The connection response window setting unit 1630 may transmit a time period configuration information for a UE connection response window in a MIB, an RMSI, an OSI, a DCI, an RRC message, a handover message, or a combination thereof. The time period may be configured based on a MIB, an RMSI, an OSI, a DCI, an RRC message, a handover message, or a combination thereof. The connection response window setting unit 1630 may determine, based on an indication of the position in the transmission sequence, a connection response window. The connection response window setting unit 1630 may set a connection response window based on the identified first random access transmission opportunity. In some examples, the connection response window may include a number of available random access resources. The connection response window may include a time period. The connection response window may include a number of available random access resources. The connection response window may include a RAR window.

The next transmission opportunity identifier 1635 may determine the next random access transmission opportunity for the UE. The exclusion period unit 1640 may refrain from transmitting the first connection response during the exclusion period preceding the next random access transmission opportunity. The transmission opportunity set identifier 1645 may identify a set of random access transmission opportunities associated with the UE. The first available transmission opportunity identifier 1650 may identify a first random access transmission opportunity associated with the UE.

The connection response transmission generator 1655 may generate a connection response for transmission. In some cases, the first connection response may include a RAR. In some cases, the first connection response identifies resources for an uplink data transmission by the UE. The time period configuration unit 1660 may transmit time period configuration information for a UE connection response window in a MIB, an RMSI, an OSI, a DCI, an RRC message, a handover message, or a combination thereof. The subset size selector 1665 may transmit an indication of a size of a subset of the set of random access transmission opportunities available for transmission of the at least one connection request by the UE. The handover message generator 1670 may transmit a handover message to the UE, where the handover message includes an indication of the first random access transmission opportunity. The position identifier 1675 may identify the position of a connection request in a transmission sequence (e.g., based at least in part on the indication). In some cases, the indication includes a preamble corresponding to the position in the transmission sequence. The indication set generator 1680 may transmit a set of indications of positions in the transmission sequence.

Figure 17:
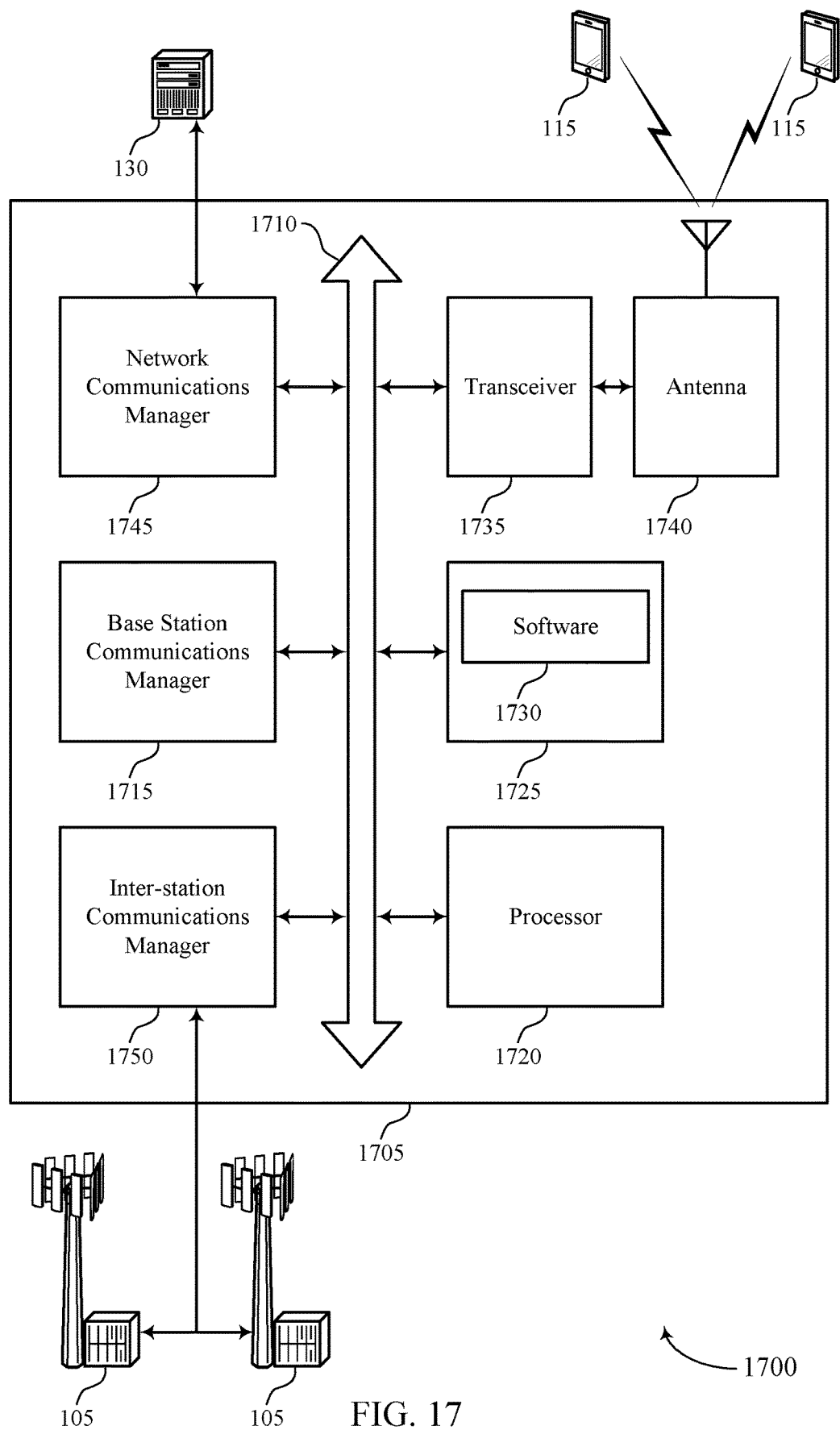
FIG. 17 illustrates a block diagram of a system including a base station that supports RAR window ambiguity for multiple message1 transmissions in accordance with aspects of the present disclosure.

FIG. 17 shows a diagram of a system 1700 including a device 1705 that supports RAR window ambiguity for multiple message1 transmissions in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting random access response window ambiguity for multiple message1 transmissions).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support random access response window ambiguity for multiple message1 transmissions. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas. In some examples, the device 1705 may include a single antenna 1740. However, in some cases the device 1705 may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an LTE/LTE-A wireless communication network technology to provide communication between base stations 105.

Figure 18:
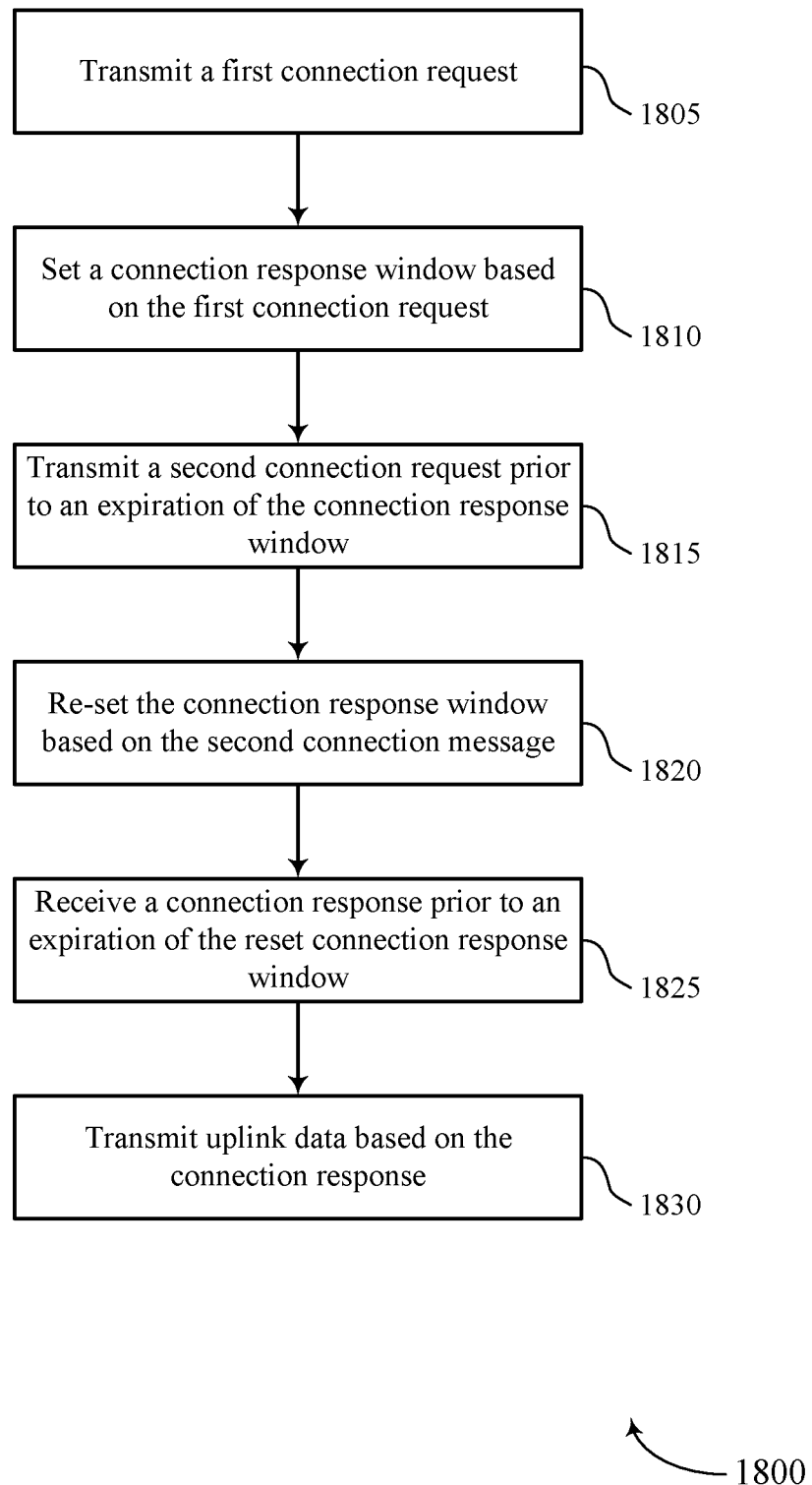
FIGS. 18 through 26 illustrate methods for RAR window ambiguity for multiple message1 transmissions in accordance with aspects of the present disclosure.

FIG. 18 shows a flowchart illustrating a method 1800 for RAR window ambiguity for multiple message1 transmissions in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may transmit a first connection request. The operations of 1805 may be performed according to the methods described herein. In certain examples, aspects of the operations of 1805 may be performed by a connection request transmission scheduler as described with reference to FIGS. 10 through 13.

At 1810 the UE 115 may set a connection response window based on the first connection request. The operations of 1810 may be performed according to the methods described herein. In certain examples, aspects of the operations of 1810 may be performed by a connection response window setting unit as described with reference to FIGS. 10 through 13.

At 1815 the UE 115 may transmit a second connection request prior to an expiration of the connection response window. The operations of 1815 may be performed according to the methods described herein. In certain examples, aspects of the operations of 1815 may be performed by a connection request transmission scheduler as described with reference to FIGS. 10 through 13.

At 1820 the UE 115 may re-set the connection response window based on the second connection message. The operations of 1820 may be performed according to the methods described herein. In certain examples, aspects of the operations of 1820 may be performed by a connection response window setting unit as described with reference to FIGS. 10 through 13.

At 1825 the UE 115 may receive a connection response prior to an expiration of the reset connection response window. The operations of 1825 may be performed according to the methods described herein. In certain examples, aspects of the operations of 1825 may be performed by a connection response processor as described with reference to FIGS. 10 through 13.

At 1830 the UE 115 may transmit uplink data based on the connection response. The operations of 1830 may be performed according to the methods described herein. In certain examples, aspects of the operations of 1830 may be performed by a uplink data transmission scheduler as described with reference to FIGS. 10 through 13.

Figure 19:
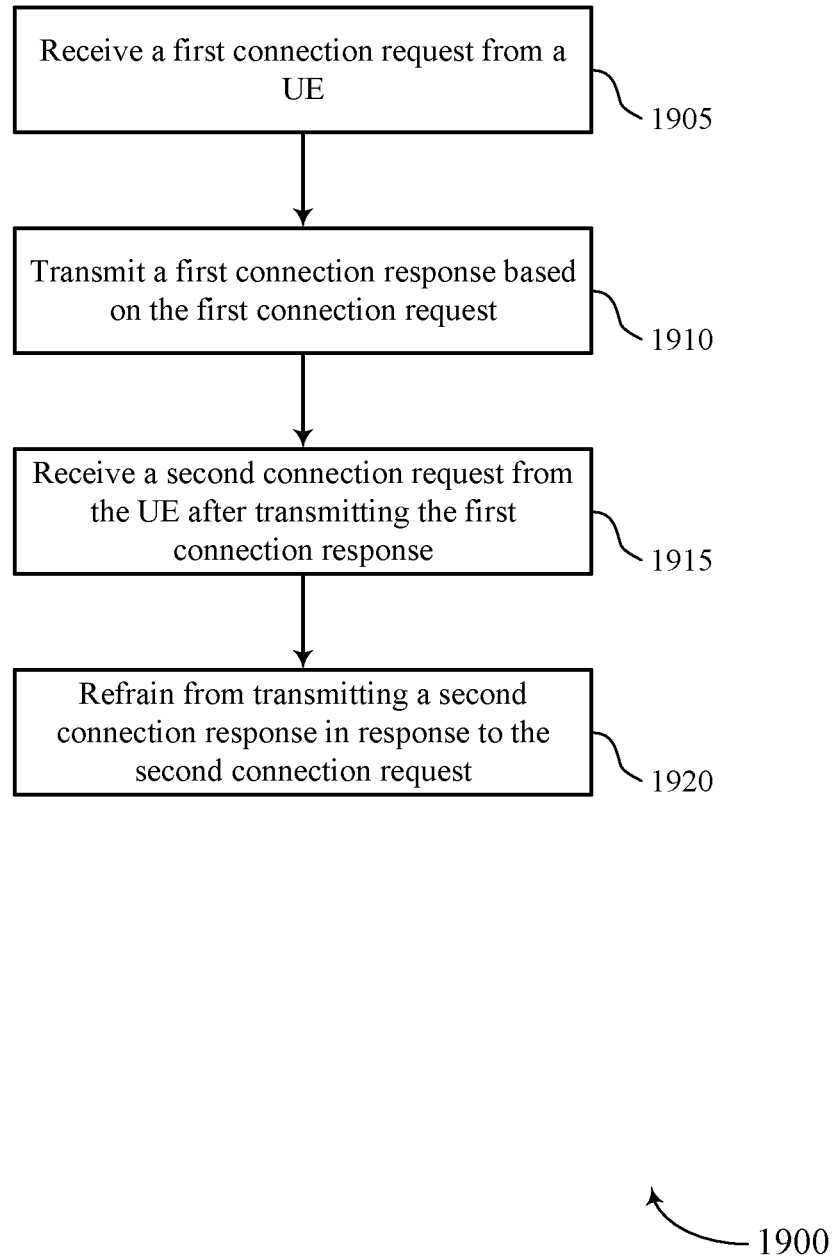

FIG. 19 shows a flowchart illustrating a method 1900 for RAR window ambiguity for multiple message1 transmissions in accordance with aspects of the present disclosure. The operations of method 1900 may be implemented by a base station 105 or its components as described herein. For example, the operations of method 1900 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may receive a first connection request from a UE. The operations of 1905 may be performed according to the methods described herein. In certain examples, aspects of the operations of 1905 may be performed by a connection request processor as described with reference to FIGS. 14 through 17.

At 1910 the base station 105 may transmit a first connection response based on the first connection request. The operations of 1910 may be performed according to the methods described herein. In certain examples, aspects of the operations of 1910 may be performed by a connection response transmission scheduler as described with reference to FIGS. 14 through 17.

At 1915 the base station 105 may receive a second connection request from the UE after transmitting the first connection response. The operations of 1915 may be performed according to the methods described herein. In certain examples, aspects of the operations of 1915 may be performed by a connection request processor as described with reference to FIGS. 14 through 17.

At 1920 the base station 105 may refrain from transmitting a second connection response in response to the second connection request. The operations of 1920 may be performed according to the methods described herein. In certain examples, aspects of the operations of 1920 may be performed by a connection response transmission scheduler as described with reference to FIGS. 14 through 17.

Figure 20:
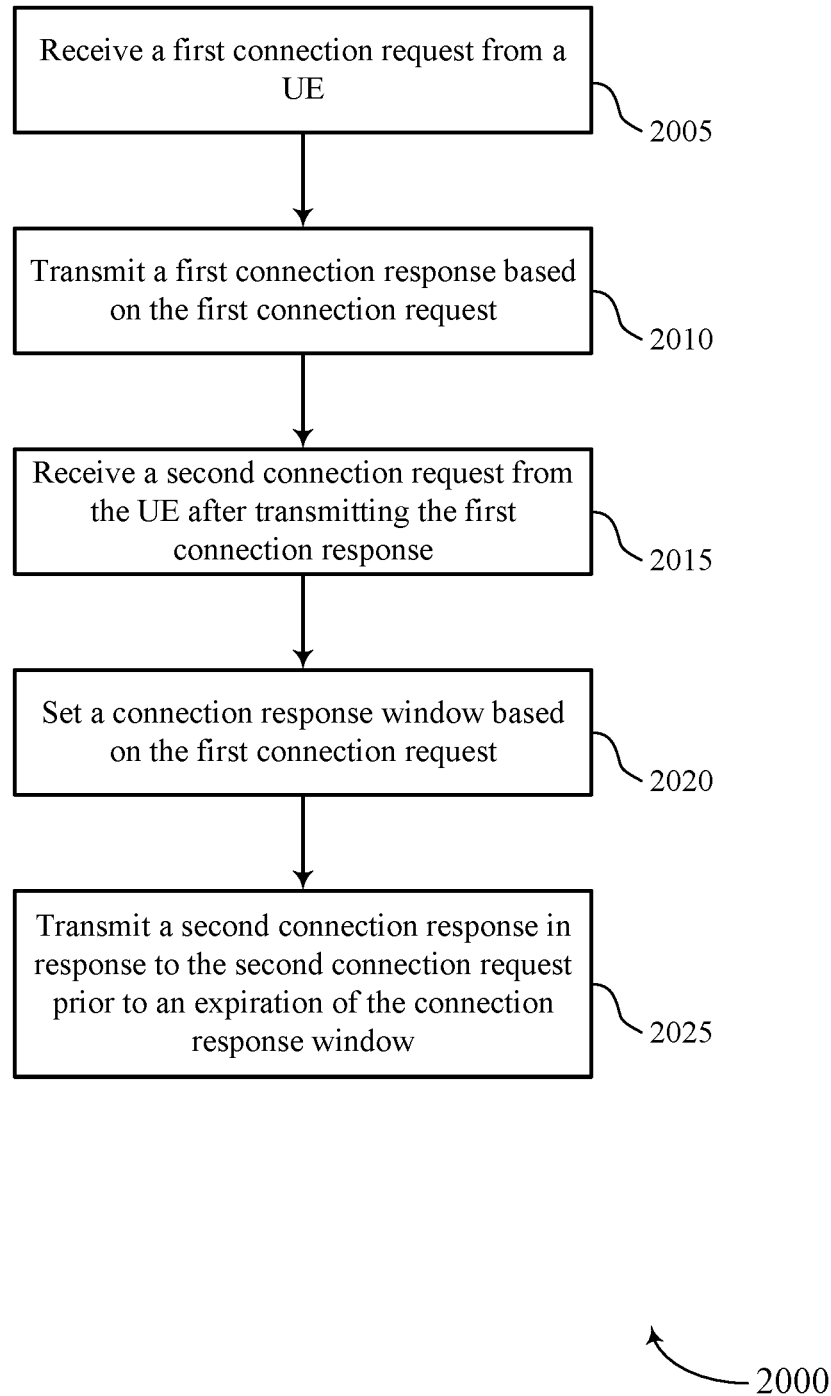

FIG. 20 shows a flowchart illustrating a method 2000 for RAR window ambiguity for multiple message1 transmissions in accordance with aspects of the present disclosure. The operations of method 2000 may be implemented by a base station 105 or its components as described herein. For example, the operations of method 2000 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may receive a first connection request from a UE. The operations of 2005 may be performed according to the methods described herein. In certain examples, aspects of the operations of 2005 may be performed by a connection request processor as described with reference to FIGS. 14 through 17.

At 2010 the base station 105 may transmit a first connection response based on the first connection request. The operations of 2010 may be performed according to the methods described herein. In certain examples, aspects of the operations of 2010 may be performed by a connection response transmission scheduler as described with reference to FIGS. 14 through 17.

At 2015 the base station 105 may receive a second connection request from the UE after transmitting the first connection response. The operations of 2015 may be performed according to the methods described herein. In certain examples, aspects of the operations of 2015 may be performed by a connection request processor as described with reference to FIGS. 14 through 17.

At 2020 the base station 105 may set a connection response window based on the first connection request. The operations of 2020 may be performed according to the methods described herein. In certain examples, aspects of the operations of 2020 may be performed by a connection response window setting unit as described with reference to FIGS. 14 through 17.

At 2025 the base station 105 may transmit a second connection response in response to the second connection request prior to an expiration of the connection response window. The operations of 2025 may be performed according to the methods described herein. In certain examples, aspects of the operations of 2025 may be performed by a connection response transmission scheduler as described with reference to FIGS. 14 through 17.

Figure 21:
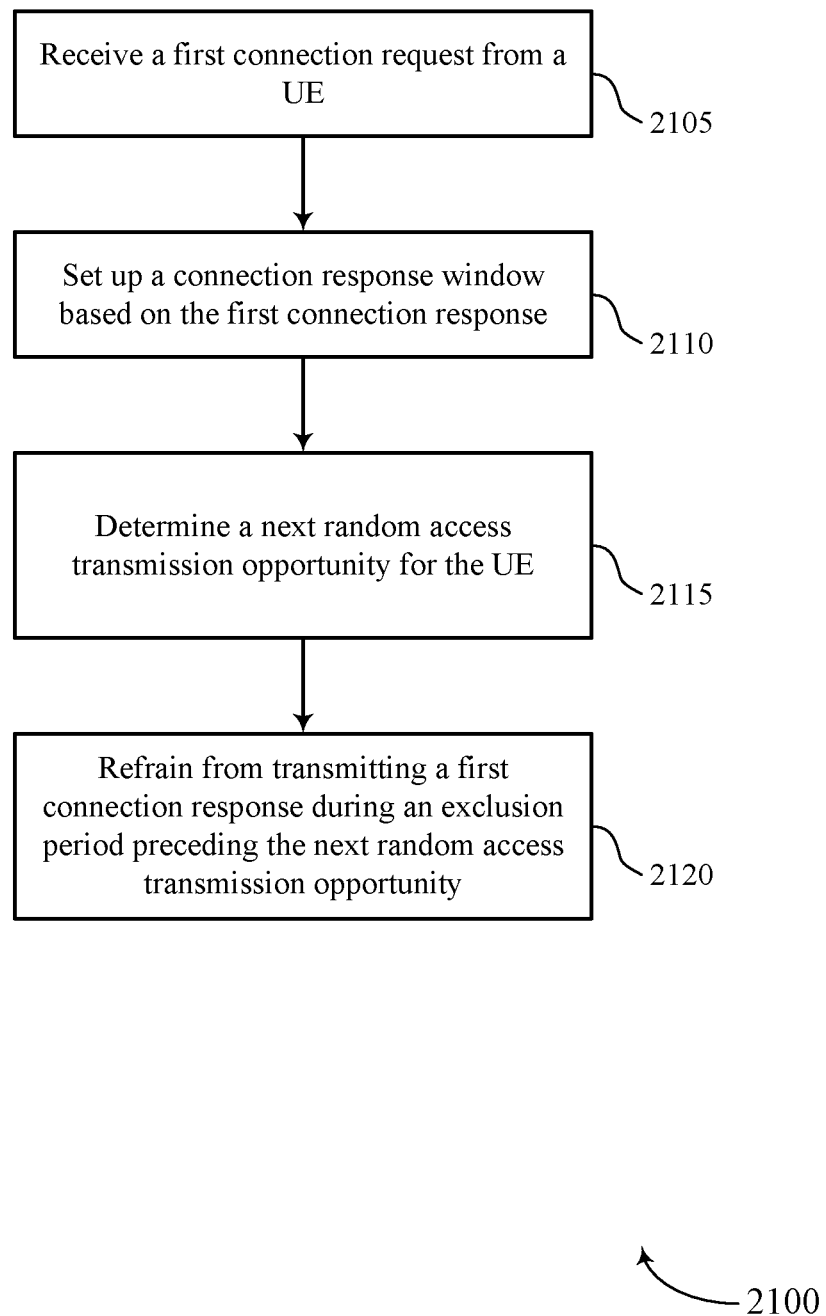

FIG. 21 shows a flowchart illustrating a method 2100 for RAR window ambiguity for multiple message1 transmissions in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may receive a first connection request from a UE. The operations of 2105 may be performed according to the methods described herein. In certain examples, aspects of the operations of 2105 may be performed by a connection request processor as described with reference to FIGS. 14 through 17.

At 2110 the base station 105 may set up a connection response window based on the first connection request. The operations of 2110 may be performed according to the methods described herein. In certain examples, aspects of the operations of 2110 may be performed by a connection response window setting unit as described with reference to FIGS. 14 through 17.

At 2115 the base station 105 may determine a next random access transmission opportunity for the UE. The operations of 2115 may be performed according to the methods described herein. In certain examples, aspects of the operations of 2115 may be performed by a next transmission opportunity identifier as described with reference to FIGS. 14 through 17.

At 2120 the base station 105 may refrain from transmitting a first connection response during an exclusion period preceding the next random access transmission opportunity within the connection response window. The operations of 2120 may be performed according to the methods described herein. In certain examples, aspects of the operations of 2120 may be performed by an exclusion period unit as described with reference to FIGS. 14 through 17.

Figure 22:
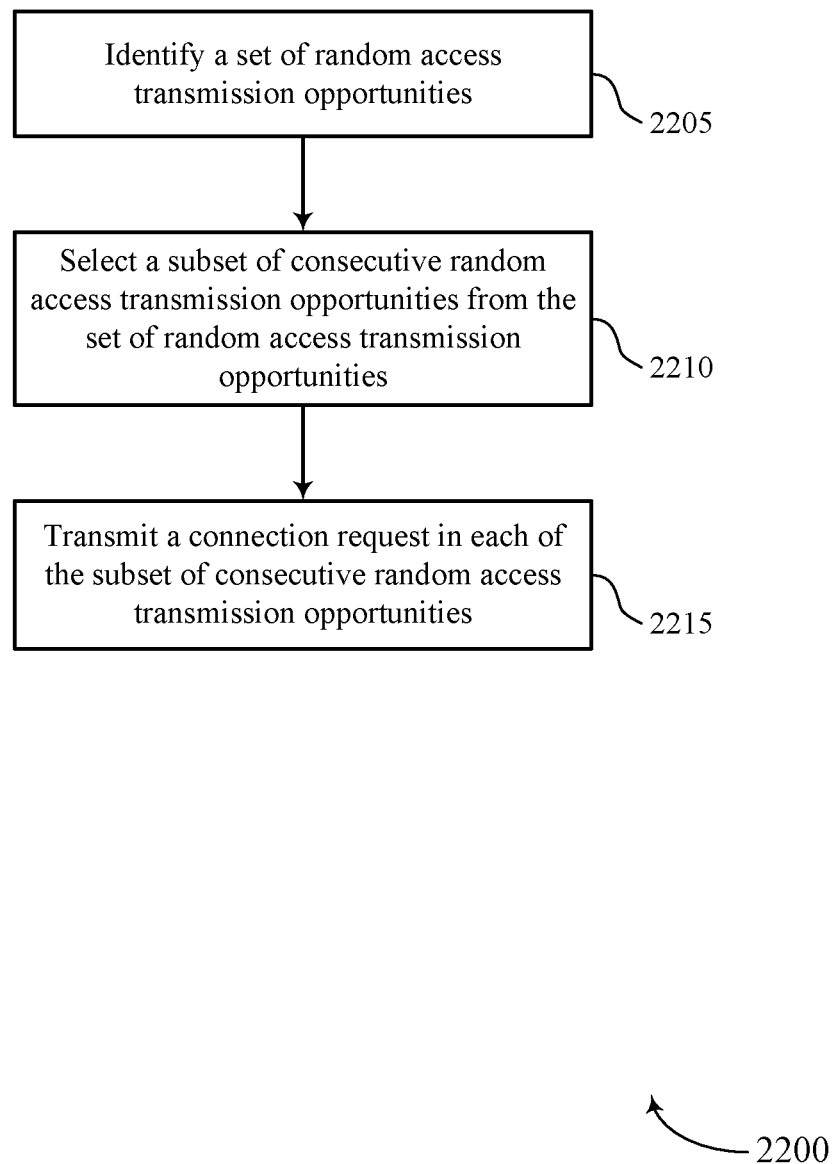

FIG. 22 shows a flowchart illustrating a method 2200 for RAR window ambiguity for multiple message1 transmissions in accordance with aspects of the present disclosure. The operations of method 2200 may be implemented by a UE 115 or its components as described herein. For example, the operations of method 2200 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may identify, a set of random access transmission opportunities. The operations of 2205 may be performed according to the methods described herein. In certain examples, aspects of the operations of 2205 may be performed by a transmission opportunity set identifier as described with reference to FIGS. 10 through 13.

At 2210 the UE 115 may select a subset of consecutive random access transmission opportunities from the set of random access transmission opportunities. The operations of 2210 may be performed according to the methods described herein. In certain examples, aspects of the operations of 2210 may be performed by a subset selector as described with reference to FIGS. 10 through 13.

At 2215 the UE 115 may transmit a connection request in each of the subset of consecutive random access transmission opportunities. The operations of 2215 may be performed according to the methods described herein. In certain examples, aspects of the operations of 2215 may be performed by a connection request transmission scheduler as described with reference to FIGS. 10 through 13.

Figure 23:
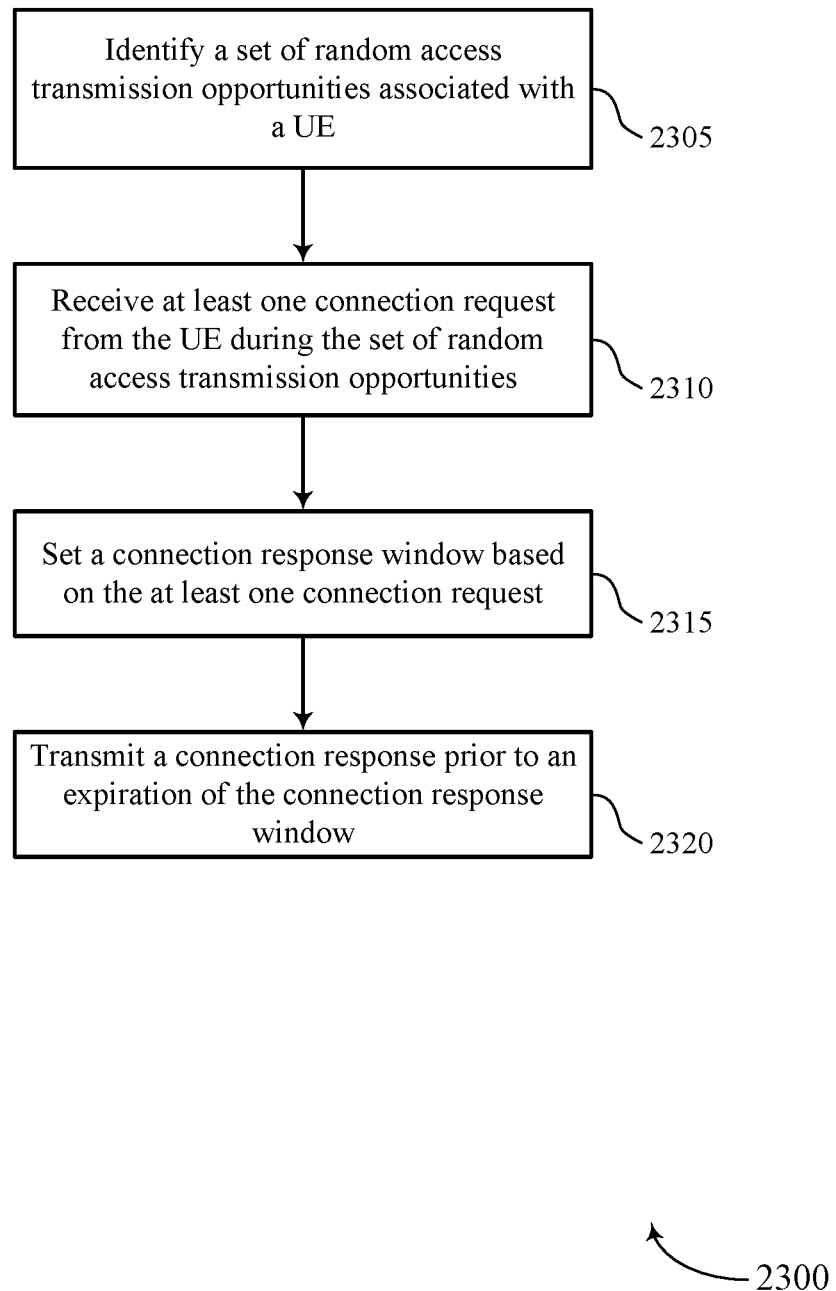

FIG. 23 shows a flowchart illustrating a method 2300 for RAR window ambiguity for multiple message1 transmissions in accordance with aspects of the present disclosure. The operations of method 2300 may be implemented by a base station 105 or its components as described herein. For example, the operations of method 2300 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2305 the base station 105 may identify a set of random access transmission opportunities associated with a UE. The operations of 2305 may be performed according to the methods described herein. In certain examples, aspects of the operations of 2305 may be performed by a transmission opportunity set identifier as described with reference to FIGS. 14 through 17.

At 2310 the base station 105 may receive at least one connection request from the UE during the set of random access transmission opportunities. The operations of 2310 may be performed according to the methods described herein. In certain examples, aspects of the operations of 2310 may be performed by a connection request processor as described with reference to FIGS. 14 through 17.

At 2315 the base station 105 may set a connection response window based on the at least one connection request. The operations of 2315 may be performed according to the methods described herein. In certain examples, aspects of the operations of 2315 may be performed by a connection response window setting unit as described with reference to FIGS. 14 through 17.

At 2320 the base station 105 may transmit a connection response prior to an expiration of the connection response window. The operations of 2320 may be performed according to the methods described herein. In certain examples, aspects of the operations of 2320 may be performed by a connection response transmission scheduler as described with reference to FIGS. 14 through 17.

Figure 24:
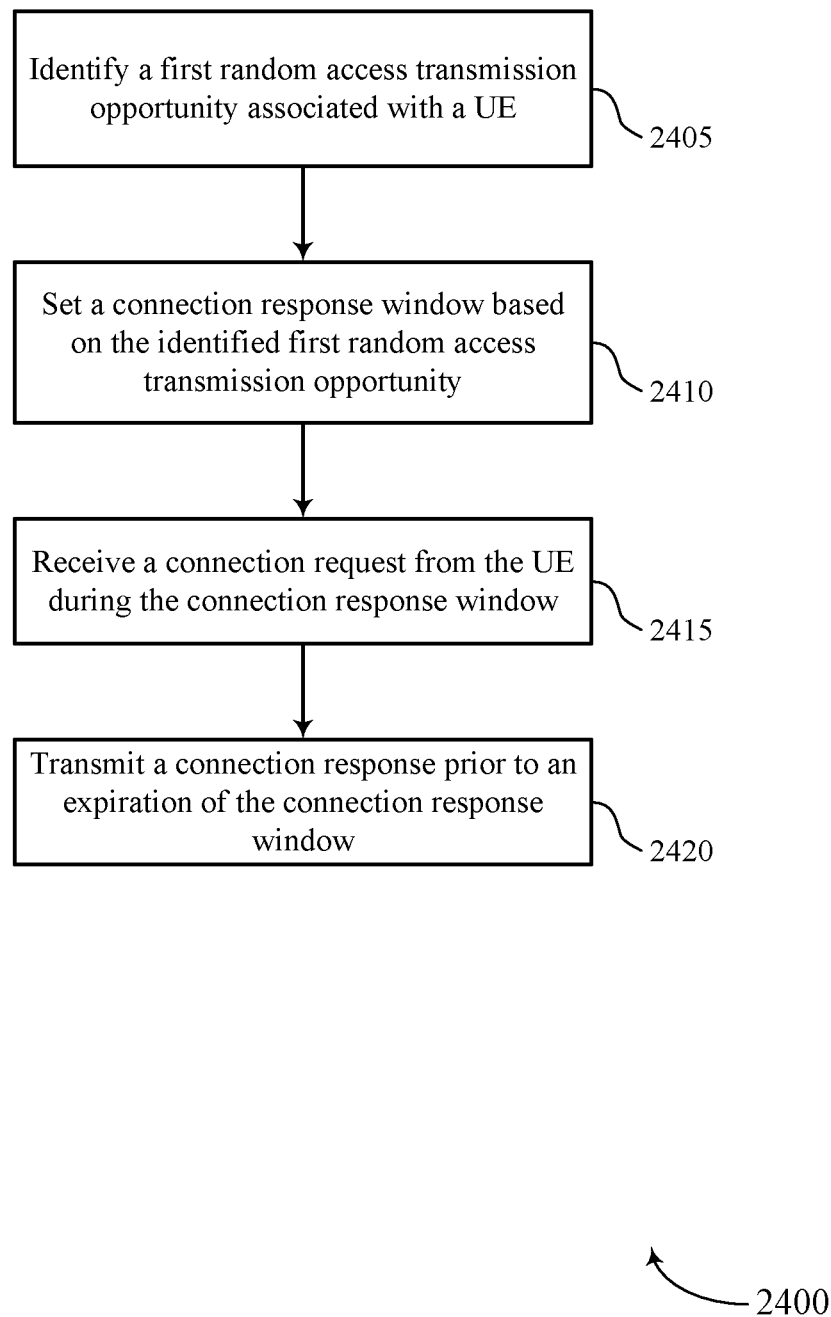

FIG. 24 shows a flowchart illustrating a method 2400 for RAR window ambiguity for multiple message1 transmissions in accordance with aspects of the present disclosure. The operations of method 2400 may be implemented by a base station 105 or its components as described herein. For example, the operations of method 2400 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may identify a first random access transmission opportunity associated with a UE. The operations of 2405 may be performed according to the methods described herein. In certain examples, aspects of the operations of 2405 may be performed by a first available transmission opportunity identifier as described with reference to FIGS. 14 through 17.

At 2410 the base station 105 may set a connection response window based on the identified first random access transmission opportunity. The operations of 2410 may be performed according to the methods described herein. In certain examples, aspects of the operations of 2410 may be performed by a connection response window setting unit as described with reference to FIGS. 14 through 17.

At 2415 the base station 105 may receive a connection request from the UE during the connection response window. The operations of 2415 may be performed according to the methods described herein. In certain examples, aspects of the operations of 2415 may be performed by a connection request processor as described with reference to FIGS. 14 through 17.

At 2420 the base station 105 may transmit a connection response prior to an expiration of the connection response window. The operations of 2420 may be performed according to the methods described herein. In certain examples, aspects of the operations of 2420 may be performed by a connection response transmission scheduler as described with reference to FIGS. 14 through 17.

Figure 25:
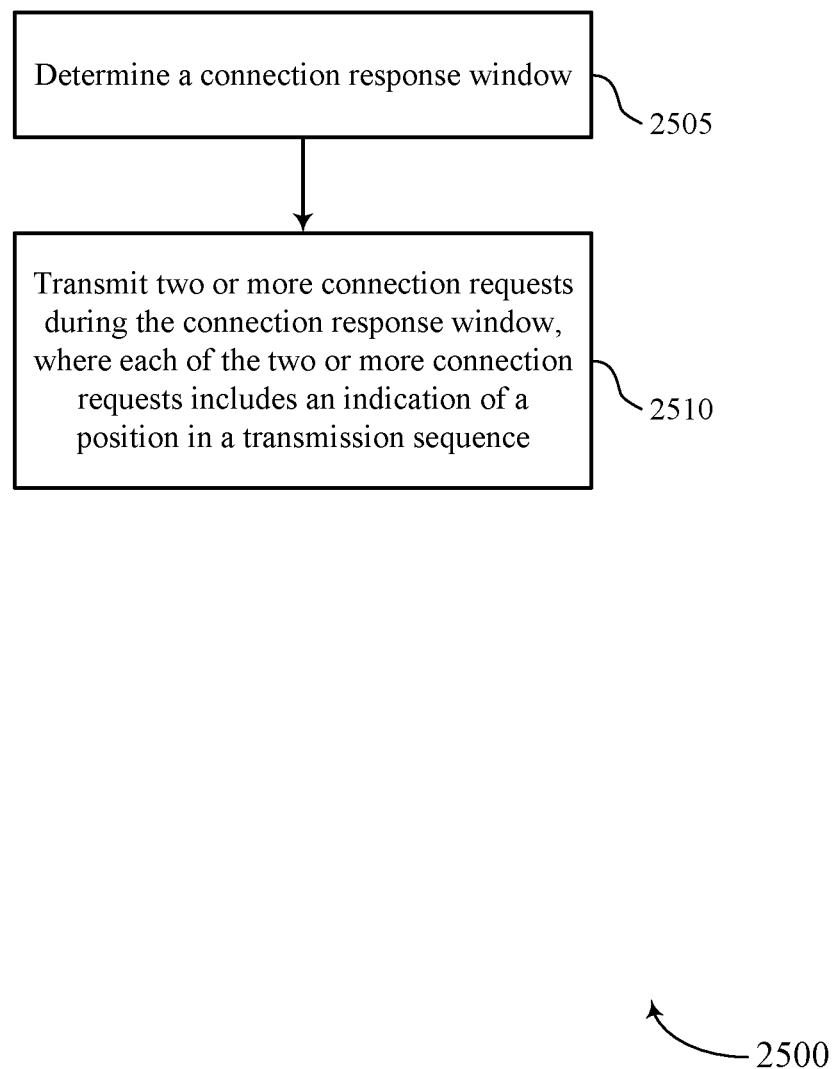

FIG. 25 shows a flowchart illustrating a method 2500 for RAR window ambiguity for multiple message1 transmissions in accordance with aspects of the present disclosure. The operations of method 2500 may be implemented by a UE 115 or its components as described herein. For example, the operations of method 2500 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 2505 the UE 115 may determine a connection response window. The operations of 2505 may be performed according to the methods described herein. In certain examples, aspects of the operations of 2505 may be performed by a connection response window setting unit as described with reference to FIGS. 10 through 13.

At 2510 the UE 115 may transmit two or more connection requests during the connection response window, wherein each of the two or more connection requests comprises an indication of a position in a transmission sequence. The operations of 2510 may be performed according to the methods described herein. In certain examples, aspects of the operations of 2510 may be performed by a connection request transmission scheduler as described with reference to FIGS. 10 through 13.

Figure 26:
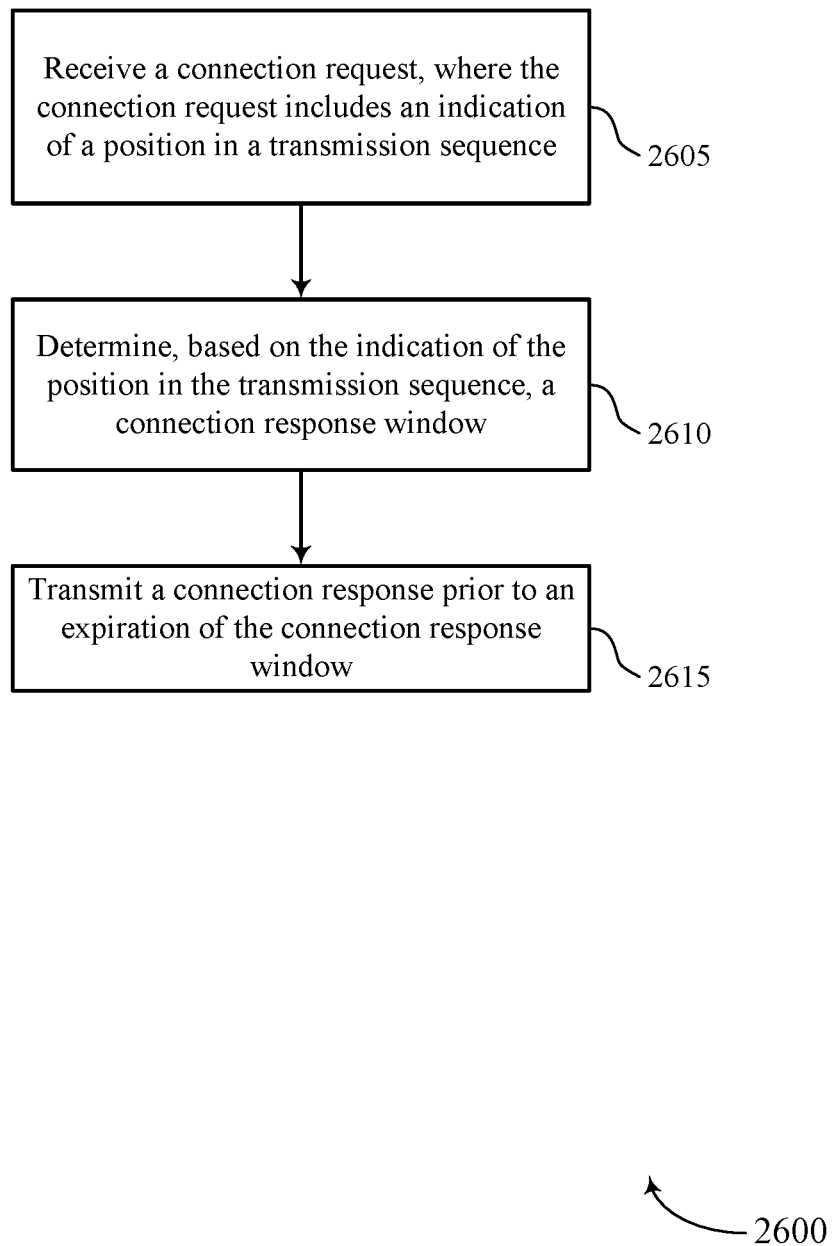

FIG. 26 shows a flowchart illustrating a method 2600 for RAR window ambiguity for multiple message1 transmissions in accordance with aspects of the present disclosure. The operations of method 2600 may be implemented by a base station 105 or its components as described herein. For example, the operations of method 2600 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2605 the base station 105 may receive a connection request, where the connection request comprises an indication of a position in a transmission sequence. The operations of 2605 may be performed according to the methods described herein. In certain examples, aspects of the operations of 2605 may be performed by a connection request processor as described with reference to FIGS. 14 through 17.

At 2610 the base station 105 may determine, based on the indication of the position in the transmission sequence, a connection response window. The operations of 2610 may be performed according to the methods described herein. In certain examples, aspects of the operations of 2610 may be performed by a connection response window setting unit as described with reference to FIGS. 14 through 17.

At 2615 the base station 105 may transmit a connection response prior to an expiration of the connection response window. The operations of 2615 may be performed according to the methods described herein. In certain examples, aspects of the operations of 2615 may be performed by a connection response transmission scheduler as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, by a user equipment (UE), a first connection request on a first transmission beam;
   setting a connection response window based at least in part on the first connection request;
   transmitting a second connection request prior to an expiration of the connection response window on a second transmission beam different from the first transmission beam;
   re-setting a user equipment connection response counter associated with the connection response window, wherein the user equipment connection response counter corresponds to a number of contention free random access resources;
   receiving a connection response prior to an expiration of the reset connection response window; and
   transmitting uplink data based at least in part on the connection response.

2. The method of claim 1, further comprising:
   re-setting the connection response window each time an additional connection response message is transmitted prior to the expiration of the connection response window.

3. The method of claim 1, wherein receiving the connection response comprises:

receiving a first connection response in response to the first connection request; and decoding the first connection response, wherein the second connection request is transmitted before the first connection response is decoded.

4. The method of claim 3, wherein the uplink data is transmitted based at least in part on the first connection response.

5. The method of claim 3, further comprising:

receiving a second connection response based at least in part on the second connection request, wherein the uplink data is transmitted based at least in part on the second connection response.

6. The method of claim 1, wherein the connection response window comprises a random access response (RAR) window.

7. The method of claim 1, wherein the connection response comprises a random access response (RAR).

8. The method of claim 1, wherein the connection response identifies resources for an uplink data transmission by the UE.

9. The method of claim 1, wherein the connection response window comprises a time period.

10. The method of claim 9, wherein the time period is configured based at least in part on a master information block (MIB), remaining minimum system information (RMSI), open systems interconnection (OSI), downlink control information (DCI), a radio resource control (RRC) message, a handover message, or a combination thereof.

11. The method of claim 1, wherein a connection request comprises a random access preamble transmission.

12. The method of claim 1, wherein:

the first connection request comprises a first random access preamble transmission; and the second connection request comprises a second random access preamble transmission.

13. The method of claim 1, wherein the first connection request is transmitted using a first transmission beam, and the second connection request is transmitted using a second connection transmission beam.

14. The method of claim 1, wherein the uplink data comprises a radio resource control (RRC) connection request.

15. The method of claim 1, wherein the uplink data comprises a random access channel (RACH) MSG3.

16. A method for wireless communication, comprising:

receiving, at a base station, a first connection request from a user equipment (UE);

initializing a base station Random Access Response window having one or more exclusion periods;

transmitting a first connection response based at least in part on the first connection request;

receiving a second connection request from the UE after transmitting the first connection response;

determining to transmit a second connection response or refrain from transmitting the second connection response in response to the second connection request based on the one or more exclusion periods; and re-setting a base station connection response counter when the second connection response is transmitted wherein the base station connection response counter corresponds to a number of contention free random access resources.

17. The method of claim 16, wherein:

the first connection request comprises a first random access preamble transmission; and the second connection request comprises a second random access preamble transmission.

18. The method of claim 16, further comprising: setting a connection response window based at least in part on the first connection request; and transmitting the second connection response in response to the second connection request prior to an expiration of the connection response window.

19. The method of claim 16, further comprising:

transmitting time period configuration information for a UE connection response window in a master information block (MIB), remaining minimum system information (RMSI), open systems interconnection (OSI), downlink control information (DCI), a radio resource control (RRC) message, a handover message, or a combination thereof.

* * * * *